US008512598B2

(12) United States Patent
Choi et al.

(10) Patent No.: US 8,512,598 B2
(45) Date of Patent: Aug. 20, 2013

(54) LIQUID CRYSTAL COMPOUNDS AND METHOD FOR PREPARING THE SAME

(75) Inventors: Kyung-Hee Choi, Hwaseong (KR); Sun-Hee Lee, Hwaseong (KR); Jin-Wook Choi, Hwaseong (KR)

(73) Assignee: Dongjin Semichem Co., Ltd., Incheon (KR)

( * ) Notice: Subject to any disclaimer, the term of this patent is extended or adjusted under 35 U.S.C. 154(b) by 300 days.

(21) Appl. No.: 13/126,874

(22) PCT Filed: Dec. 14, 2009

(86) PCT No.: PCT/KR2009/007468
§ 371 (c)(1),
(2), (4) Date: Apr. 29, 2011

(87) PCT Pub. No.: WO2010/071335
PCT Pub. Date: Jun. 24, 2010

(65) Prior Publication Data
US 2011/0237849 A1    Sep. 29, 2011

(30) Foreign Application Priority Data
Dec. 16, 2008    (KR) ........................ 10-2008-0127770

(51) Int. Cl.
C09K 19/30    (2006.01)
C07C 13/18    (2006.01)
C07C 13/19    (2006.01)
C07C 13/28    (2006.01)
C07C 1/20    (2006.01)
C07C 1/22    (2006.01)

(52) U.S. Cl.
USPC .............................. 252/299.63; 585/1; 585/25

(58) Field of Classification Search
CPC ............. C09K 19/3001; C09K 1/3028; C09K 1/3048; C09K 1/3054; C09K 2019/0407; C09K 2019/3043
USPC .................................. 252/299.63; 585/1, 25
See application file for complete search history.

(56) References Cited

U.S. PATENT DOCUMENTS

| 4,439,015 A | 3/1984 | Rich et al. |
| 4,556,745 A | 12/1985 | Carr et al. |
| 6,569,503 B1 * | 5/2003 | Hirschmann et al. .......... 428/1.1 |

FOREIGN PATENT DOCUMENTS

| CN | 1784481 A | 6/2006 |
| CN | 101130694 A | 2/2008 |
| EP | 1897928 A1 | 3/2008 |
| JP | 2003-040814 A | 2/2003 |

OTHER PUBLICATIONS

Notice of Allowance in connection with related CN Patent Application No. 200980150282.0 dated Mar. 19, 2013.

\* cited by examiner

*Primary Examiner* — Shean C Wu
(74) *Attorney, Agent, or Firm* — Gifford, Krass, Sprinkle, Anderson & Citkowski, P.C.

(57) ABSTRACT

The present invention relates to a liquid crystal compound for liquid crystal display. More particularly, the present invention provides a vinylcyclohexylbenzene, its derivatives and the preparation method thereof where the present invention produces only trans-isomer by using Heck coupling reaction instead of Wittig reaction in the introduction to ethenyl group in the central backbone in the preparation process of intermediate. The liquid crystal compound can make the liquid crystal composition have a wide mesophase range and low viscosity.

11 Claims, No Drawings

LIQUID CRYSTAL COMPOUNDS AND METHOD FOR PREPARING THE SAME

CROSS-REFERENCE TO RELATED APPLICATIONS

This application is the U.S. National Phase of PCT/KR2009/007468 filed Dec. 14, 2009, which claims priority of Korean Patent Application 10-2008-0127770 filed Dec. 16, 2008.

BACKGROUND OF THE INVENTION (a) Field of the Invention

The present invention relates to liquid crystal compounds including vinylcyclohexylbenzene and its derivative, and the preparation method for the same. More particularly, the present invention relates to liquid crystal compound used for liquid crystal display (LCD) having fast response time, wide phase-transition temperature and low viscosity by controlling physical property at a high clearing temperature.

(b) Description of the Related Art

The liquid crystal compound is essential material for liquid crystal flat display and is an organic compound with electro-optical characteristic that has a fluidity in liquid and anisotropy in crystal. When applying voltage to upper and lower electrodes, the change in alignment of liquid crystal compound also changes the transmission of light emitted from the backlight, thereby forming an image.

The liquid crystal composition is a mixture of about 20 liquid crystal compounds having a molecular weight of 200 to 600. The LCD using the liquid crystal composition as an essential material are displays with 20 to 30-inch panel such as laptop, monitor, mobile phone and etc., and TV or large-sized advertising display with large-sized panel, for examples 30 inches to 100 inches. The liquid crystal composition can be applied for various displays and is highly marketable product. In addition, the market of LCD expands from the polar region to the vicinity of equatorial region.

To keep the marketability of LCD product, the liquid crystal compounds must meet the requirements such as fast response time and wide operating temperature range which are suitable for TV to show fast-moving image rather than monitor or laptop.

Liquid crystal medium must have fluidity of mesophase as liquid and anisotropy as crystal (refractive index and dielectric constant). The liquid crystal compound preferably includes a central backbone such as cyclohexyl, phenyl, naphthalene, pyridazine or dioxaborane, and etc, and a side chain such as alkyl, alkoxy, alkenyl, halide, CN, NCS, and etc. The liquid crystal medium has various mesophase and temperature ranges depending on the combination of components.

As the number of cyclohexyl group or phenyl group included in the liquid crystal compound increases, the clearing temperature at mesophase or solid phase increases.

U.S. Pat. No. 4,556,745 discloses that introduction of ethylene group ($-CH_2CH_2-$) to central backbone can lower the viscosity. In addition, the conventional patents introducing ethylene group ($-CH_2CH_2-$) to central backbone are U.S. Pat. Nos. 4,035,056, 4,261,651, 4,439,015 and 4,482, 492. As disclosed in the patents, a compound including "—C(O)CH$_2$—" group in a central backbone is prepared by acylation method, and then ethylene group is introduced by the reduction method.

U.S. Pat. Nos. 4,431,853, 4,583,826, and 4,460,770 disclose that the ethylene group ($-CH_2CH_2-$) is introduced to central backbone by bromination and Grignard reaction after reducing carboxylic acid compound.

In U.S. Pat. Nos. 4,439,015, 4,550,981, 4,460,770, 4,583, 826 and 4,652,089, liquid crystal compound including ethylene group ($-CH_2CH_2-$) at central backbone is prepared by introducing ethenyl group ($-CH=CH-$) to central backbone with using triphenylphosphine (hereinafter, PPh$_3$) and aldehyde compound, and then by performing catalytic reduction. In case of using triphenylphosphine in the preparation of liquid crystal compound, most products include cis-ethenyl group. The cis-compound must be converted to trans-isomer to be used for a liquid crystal medium.

Accordingly, in JP Patent No. 3,002,429, the epoxide compound is prepared from cis-ethenyl group by using peroxides as an oxidant, and most of the compounds in trans-form are obtained by converting them with PPh$_3$.

However, because the produced trans-isomer includes a small amount of cis-isomer, several purification steps such as recrystallization must be performed to obtain pure trans-isomer.

In addition, U.S. Pat. No. 6,348,244 discloses that the compound with ethylene group in central backbone is prepared by reacting aldehyde compound with Grignard reagent and catalytic reaction, or by using n-butyllithium compound. U.S. Pat. No. 4,621,901 discloses that alkenyl group is introduced to the end of liquid crystal compound. However, the preparation methods disclosed in the documents have complex problems in preparation procedure and recrystallization.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide vinylcyclohexylbenzene compound or its derivative for liquid crystal which has low viscosity and stable and wide mesophase in the temperature of 100-250° C. or more.

An exemplary embodiment of the present invention provides liquid crystal compounds and method for preparing the same.

Another embodiment of the present invention provides a liquid crystal composition useful for liquid crystal display where the high-temperature property of the liquid crystal composition and rapid response time can be adjusted.

DETAILED DESCRIPTION

According to an embodiment of the present invention, a liquid crystal compound represented by chemical formula 1 is provided:

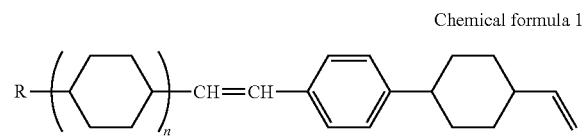

Chemical formula 1 where R is C1-C15 alkyl and n is 1 or 2.

Another embodiment of the present invention provides a liquid crystal compound represented by chemical formula 2:

Chemical formula 2

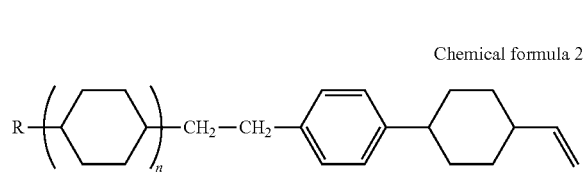

where R is C1-C15 alkyl and n is 1 or 2.

According to an embodiment of the present invention, a preparation method of liquid crystal compound represented by chemical formula 1 comprises the steps of preparing trans-compound of chemical formula 4 by reducing the compound of chemical formula 5 with sodium bis(2-methoxyethoxy) aluminum hydride, and reacting the trans-compound of chemical formula 4 according to Wittig reaction.

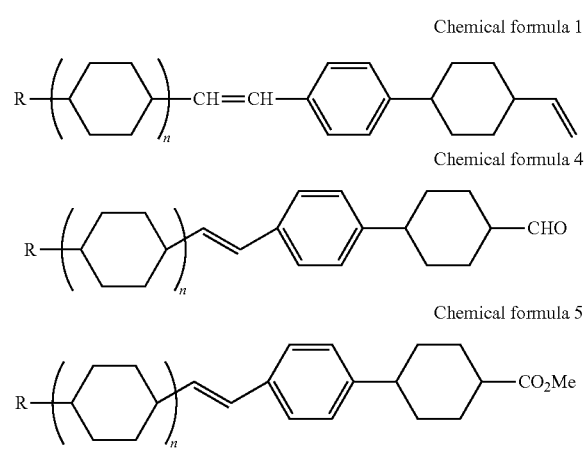

Chemical formula 1

Chemical formula 4

Chemical formula 5 where, R and n are the same as defined above.

Preferably, the compound of chemical formula 5 is prepared by reacting the compound of chemical formula 6 and the compound of chemical formula 7.

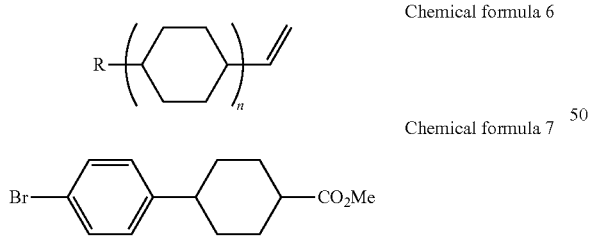

Chemical formula 6

Chemical formula 7 where R and n are the same as defined above.

According to an embodiment of the present invention, a preparation method of liquid crystal compound represented by chemical formula 2 comprises the steps of
preparing the compound of chemical formula 5-1 by hydrogenating the compound of chemical formula 5,
preparing the compound of chemical formula 3 by reducing the compound of chemical formula 5-1 with sodium bis (2-methoxyethoxy)aluminum hydride, and
reacting the compound of chemical formula 3 according to Wittig reaction.

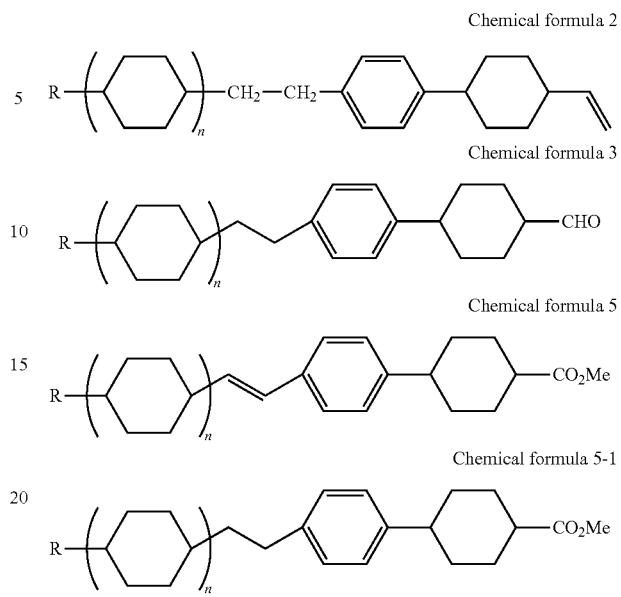

Chemical formula 2

Chemical formula 3

Chemical formula 5

Chemical formula 5-1 where, R and n are the same as defined above.

According to an embodiment of the present invention, a preparation method of liquid crystal compound represented by chemical formula 2 comprises the steps of
preparing the compound of chemical formula 12 by hydrogenating the compound of chemical formula 13,
preparing the compound of 11 by hydrolyzing the compound of chemical formula 12,
preparing the compound of 10 by reacting the compound of chemical formula 11 according to Wittig reaction,
preparing the compound of chemical formula 3 by hydrolyzing the compound having the chemical formula 10, and
reacting the compound of chemical formula 3 according to Wittig reaction.

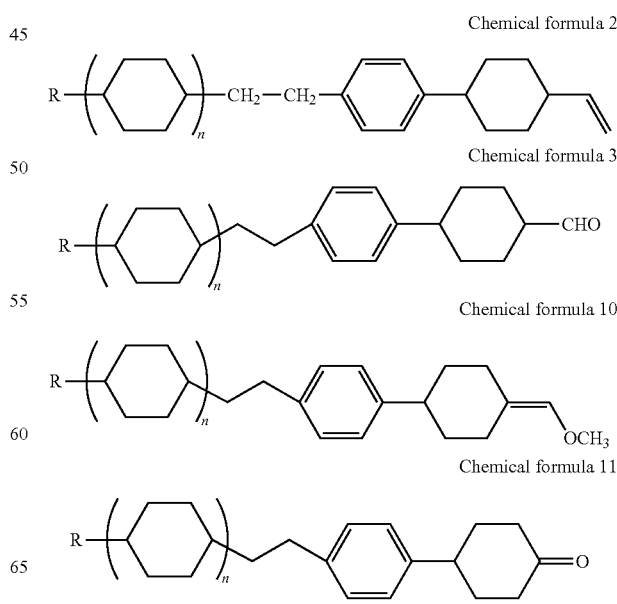

Chemical formula 2

Chemical formula 3

Chemical formula 10

Chemical formula 11

-continued

Chemical formula 12

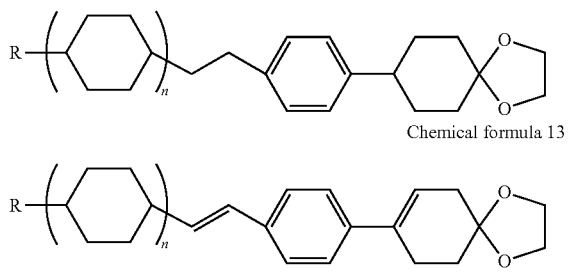

Chemical formula 13 where R and n are the same as defined above.

Preferably, the compound of chemical formula 13 is prepared by reacting the compound of chemical formula 6 and the compound of chemical formula 14.

Chemical formula 6

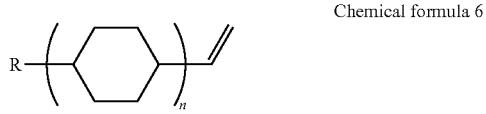

Chemical formula 14

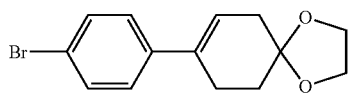

where R and n are the same as defined above.

In an embodiment of the present invention, a liquid crystal composition comprising at least one selected from the group consisting of the compounds of chemical formulae 1 and 2 is provided.

DETAILED DESCRIPTION OF THE EMBODIMENTS

Hereinafter, the present invention will be described specifically.

As described above, according to the conventional method, most of cis-form isomer compounds are produced and thus must be performed by several purification steps such as recrystallization using peroxides, thereby prolonging the process time and lowering the yield.

Thus, the present invention provides the liquid crystal compounds having three or four rings comprising cyclohexyl group or phenyl group where ethylene group or ethenyl group is in the central backbone and the terminal ring can be substituted with alkyl or vinyl group.

To develop the liquid crystal medium having fast response time and wide temperature range, the present invention provides the liquid crystal compound having three or four rings comprising cyclohexyl group or phenyl group where ethylene group or ethenyl group is in the central backbone and the terminal ring can be substituted with alkyl or vinyl group.

In the forming ethenyl group in the central backbone, trans-ethenyl group can be produced at 100 percent purity according to Heck coupling reaction instead of Wittig reaction.

In the conventional method, the products are cis-compound in the large amount and trans-compound in the small amount according to the Wittig reaction. Instead of Wittig reaction, the Heck coupling reaction is adopted for the preparation of intermediate having ethenyl group in the central backbone and thus pure trans-compound is produced. According to the preparation method of the present invention, it is not necessary to perform two steps of epoxydation and PPh3 reaction to convert the cis-isomer to trans-isomer.

Moreover, in case of using the intermediate of the present invention for producing the liquid crystal compound, only pure trans-isomer is produced. The several recrystallization steps are not required. While the ethenyl group of intermediate is reduced, the liquid crystal compound having ethylene group in the central backbone is synthesized also.

The liquid crystal compound of the present invention includes vinylcyclohexylbenzene compound represented by chemical formula 1 that ethenyl group is in the central backbone and an alkyl and vinyl are in the terminal ring.

In addition, the liquid crystal compound of the present invention includes a derivative of vinylcyclohexylbenzene compound represented by chemical formula 2.

Chemical formula 1

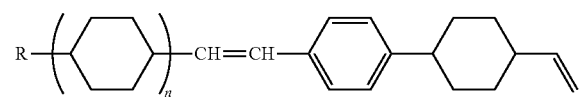

where R is C1-C15 alkyl and n is 1 or 2.

Chemical formula 2

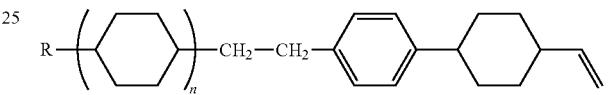

where R is C1-C15 alkyl and n is 1 or 2.

Preferably, in chemical formulae 1 and 2, R is C2-C7 alkyl.

In an embodiment, the preparation method of the compound represented by chemical formula 1 is shown schematically in reaction scheme 1.

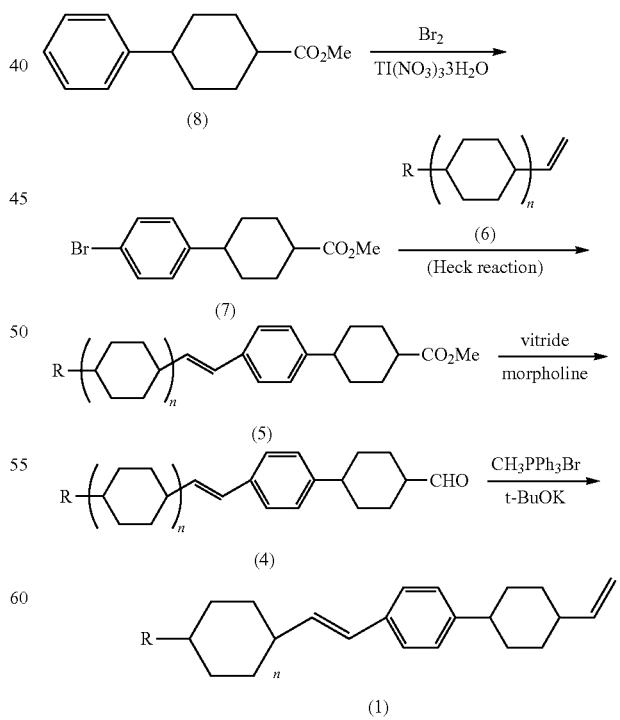

Reaction scheme 1 where R and n are the same as defined above.

More particularly, as shown in reaction scheme 1, the Heck coupling reaction instead of Wittig reaction is used in the introduction of ethenyl group in the central backbone.

More specifically, methyl-4 (4-bromophenyl)cyclohexane carboxylate of chemical formula 7 is prepared by bromination of methyl-4-phenylcyclohexane carboxylate of chemical formula 8 in the catalyst of thallium(III) nitrate. Then, the ester compound of chemical formula 5 having the ethenyl group in the central backbone is prepared by reacting the compound of chemical formula 7 with the vinylcyclohexane of chemical formula 6 according to the Heck coupling reaction. The ester compound is reduced by reacting with sodium bis(2-methoxyethoxy)aluminum hydride (vitride) to produce aldehyde compound. The aldehyde compound is recrystallized to obtain only trans-compound of chemical formula 4, and performed by Wittig reaction to produce the compound of chemical formula 1 at yield of about 9%.

In the Heck coupling reaction of reaction scheme 1, the compound of chemical formula 6 is added in an amount of 100 to 200 mol % preferably by considering the reaction stoichiometry of the compound of chemical formula 7. The Heck coupling reaction is preferably at a temperature of 100 to 150° C. for 24 to 48 hours. The amount of the compound in each step and the reaction condition are not particularly defined and can be determined at the common methods.

The preferred examples of the compound having chemical formula 1 are as follows:

1-[2-(4-ethylcyclohexyl)ethenyl]-4-(4-vinylcyclohexyl)benzene
1-[2-(4-propylcyclohexyl)ethenyl]-4-(4-vinylcyclohexyl)benzene
1-[2-(4-butylcyclohexyl)ethenyl]-4-(4-vinylcyclohexyl)benzene
1-[2-(4-pentylcyclohexyl)ethenyl]-4-(4-vinylcyclohexyl)benzene
1-[2-(4-hexylcyclohexyl)ethenyl]-4-(4-vinylcyclohexyl)benzene
1-[2-(4-heptylcyclohexyl)ethenyl]-4-(4-vinylcyclohexyl)benzene
1-[2-(4-ethylbicyclohexyl)ethenyl]-4-(4-vinylcyclohexyl)benzene
1-[2-(4-propylbicyclohexyl)ethenyl]-4-(4-vinylcyclohexyl)benzene
1-[2-(4-propylcyclohexyl)ethenyl]-4-(4-vinylcyclohexyl)benzene
1-[2-(4-butylbicyclohexyl)ethenyl]-4-(4-vinylcyclohexyl)benzene
1-[2-(4-pentylbicyclohexyl)ethenyl]-4-(4-vinylcyclohexyl)benzene
1-[2-(4-hexylbicyclohexyl)ethenyl]-4-(4-vinylcyclohexyl)benzene
1-[2-(4-hexylbicyclohexyl)ethenyl]-4-(4-vinylcyclohexyl)benzene The compound of chemical formula 2 is prepared by reducing the ethenyl group of the compound having chemical formula 1 to increase the flexibility of cyclohexyl group or phenyl group which is located at the both sides of the central backbone.

The compound of chemical formula 2 can be prepared according to any one of reaction schemes 2 and 3.

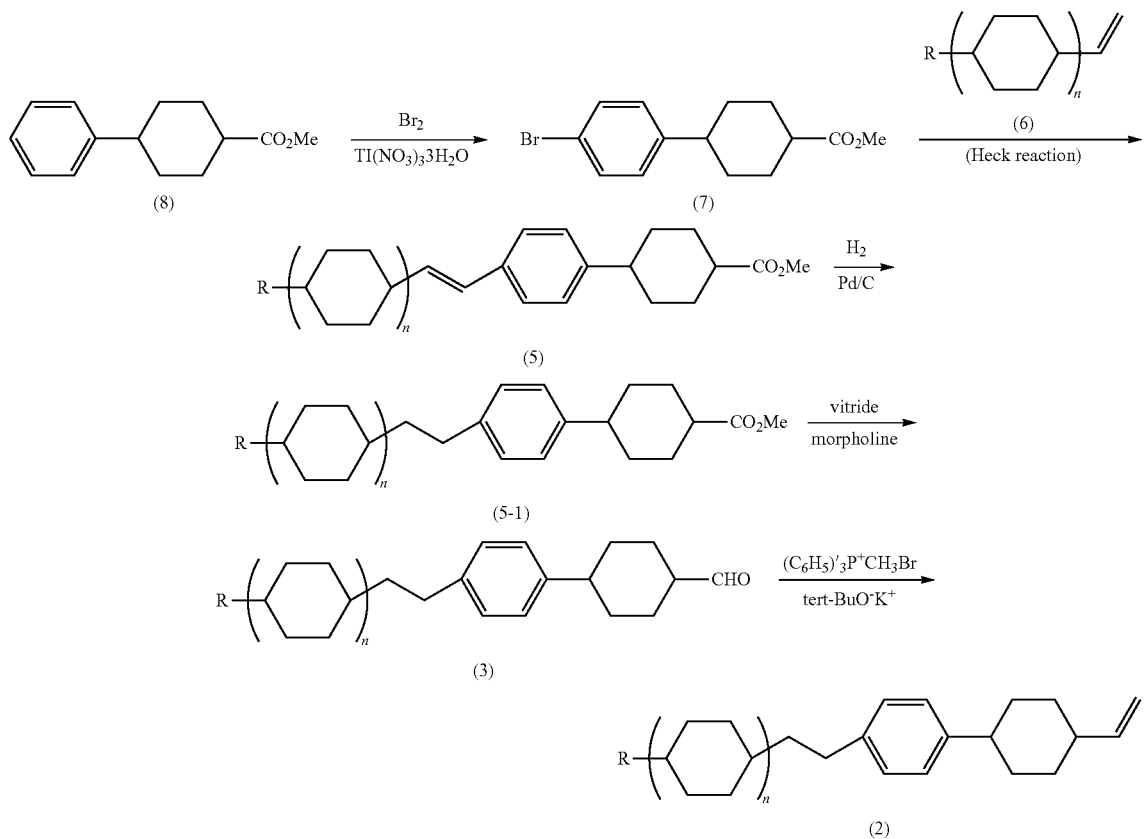

Reaction scheme 2

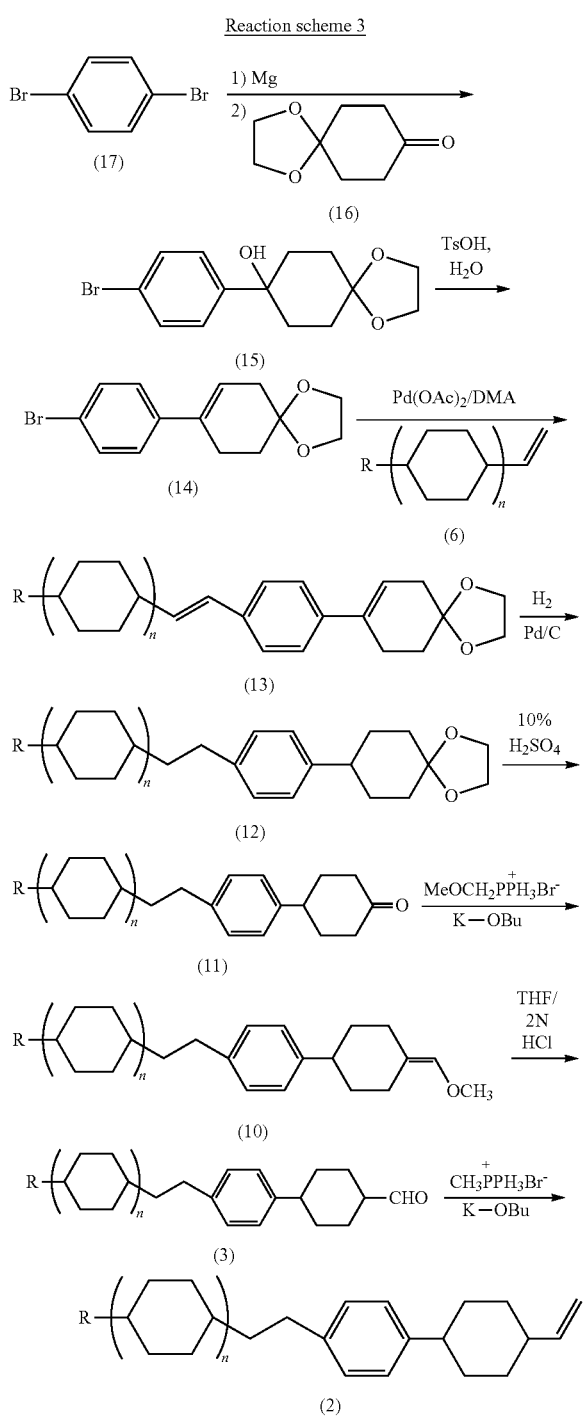

Reaction scheme 3

In reaction schemes 2 and 3, R and n are the same as defined above.

Each reaction steps are described in more detail.

Firstly, in case that the compound of chemical formula 2 is prepared according to Reaction scheme 2, the intermediate of chemical formula 5 is produced by performing Heck coupling method according to the substantially same method of Reaction scheme 1. Then, the compound of chemical formula 5-1 is produced by reducing the compound of chemical formula 5 and then the compound of chemical formula 3 and the compound of chemical formula 2 are produced with vitride and Wittig reaction according to the similar method of reaction scheme 1.

In addition, when the compound of chemical formula 2 is produced according to Reaction scheme 3, the Grignard reagent is prepared by reacting 1,4-dibromobenzene of chemical formula 17 with metal magnesium and is reacted with ketone compound of chemical formula 16 to produce the compound of chemical formula 15. Then, bromobenzene-based compound of chemical formula 14 is prepared by treating the compound of chemical formula 15 with acid and dehydration, and then is coupled with vinylcyclohexane of chemical formula 6 according to the Heck coupling reaction in the presence of palladium catalyst to produce the compound of chemical formula 13. The compound of chemical formula 13 is hydrogenated, hydrolyzed, and performed with Wittig reaction to produce the final compound of chemical formula 2. The reaction includes eight steps and produces the final product at yield of 2-3%.

Preferably, in the Heck coupling reaction of Reaction schemes 2 and 3, the compound of chemical formula 6 is added at an amount of 100 to 200 mol % with regard to the compound of chemical formula 7 or the compound of chemical formula 14. The Heck coupling reaction is preferably at a temperature of 100 to 150° C. for 24 to 48 hours. The amount of the compound in each step and an reaction condition are not particularly defined and can be determined at the common methods.

The solvent useful for Reaction schemes 1 to 3 can be any solvent used for organic synthesis, for examples chloroform, dimethylacetamide (DMA), toluene, THF, ethanol and the like.

The preferred examples of the compound having chemical formula 2 are as follows:
1-[2-(4-ethylcyclohexyl)ethyl]-4-(4-vinylcyclohexyl)benzene,
1-[2-(4-propylcyclohexyl)ethyl]-4-(4-vinylcyclohexyl)benzene,
1-[2-(4-butylcyclohexyl)ethyl]-4-(4-vinylcyclohexyl)benzene,
1-[2-(4-pentylcyclohexyl)ethyl]-4-(4-vinylcyclohexyl)benzene,
1-[2-(4-hexylcyclohexyl)ethyl]-4-(4-vinylcyclohexyl)benzene,
1-[2-(4-heptylcyclohexyl)ethyl]-4-(4-vinylcyclohexyl)benzene,
1-[2-(4-ethylbicyclohexyl)ethyl]-4-(4-vinylcyclohexyl)benzene,
1-[2-(4-propylbicyclohexyl)ethyl]-4-(4-vinylcyclohexyl) benzene,
1-[2-(4-butylbicyclohexyl)ethyl]-4-(4-vinylcyclohexyl)benzene,
1-[2-(4-pentylbicyclohexyl)ethyl]-4-(4-vinylcyclohexyl) benzene,
1-[2-(4-hexylbicyclohexyl)ethyl]-4-(4-vinylcyclohexyl) benzene, and
1-[2-(4-heptylbicyclohexyl)ethyl]-4-(4-vinylcyclohexyl) benzene.

In an embodiment of the present invention, the liquid crystal composition for liquid crystal display including at least one selected from the group consisting of the compound of chemical formula 1 and the compound of chemical formula 2 is provided. The amount of at least one selected from the group consisting of the compounds of chemical formulae 1 and 2 can be 0.1 to 20 wt % based on the liquid crystal composition preferably, but not limited thereto.

The other liquid crystal compounds can be contained as well as the compounds of chemical formulae 1 and 2 in the liquid crystal composition to suitably control the properties of the liquid crystal composition. The amounts of the components contained in the liquid crystal composition can be adjusted variously according to the using purpose.

The liquid crystal composition including the compounds of chemical formulae 1 and 2 makes the phase transition temperature wide, thereby forming liquid crystal phase at the broad temperature range. The ethenyl or ethylene introduced in the central backbone lowers the viscosity of liquid crystal, thereby largely improving the response speed of liquid crystal product. The liquid crystal medium including the liquid crystal compound can produce a liquid crystal product with high reliability, because the composition is capable of realizing fast response time and wide operating temperature range. The composition can be effectively used for TV and large-sized advertising display of which market expands explosively.

Hereinafter, the technical features and the operations of present invention are described in further detail through preferable examples. However, the following examples are only for the understanding of the present invention and the present invention is not limited to or by them.

Example 1

1-[2-(4-pentyl-bicyclohexyl)ethenyl]-4-(4-vinyl-cyclohexyl)benzene

Example 1-1

4-(4-bromophenyl)cyclohexane carboxylic acid methyl ester

Reaction scheme 4

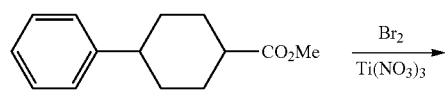

-continued

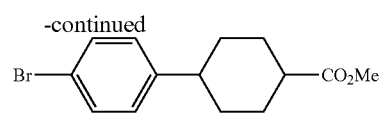

10 g (45.8 mmol) of methyl-4-phenylcyclohexane carboxylate and 3.46 g (7.78 mmol) of thallium(III) nitrate were dissolved in chloroform. 120 mL of the resulting solution was cooled to 0° C. 1.87 mL (36.6 mmol) of $Br_2$ was added dropwise to the resulting solution, and reacted at room temperature for 24 hours. Then, the reacted solution was neutralized by 10% NaOH aqueous solution, extracted by chloroform, dried by anhydrous $Na_2SO_4$, and filtered. The filtrate was concentrated under reduced pressure. The resulting material was recrystallized from ethanol to obtain 7.7 g (57%) 4-(4-bromophenyl)cyclohexane carboxylic acid methyl ester.

Example 1-2

4-{4-[2-(4-pentyl-cyclohexyl)-ethenyl]-phenyl}-cyclohexane carboxylic acid methyl ester Reaction scheme 5

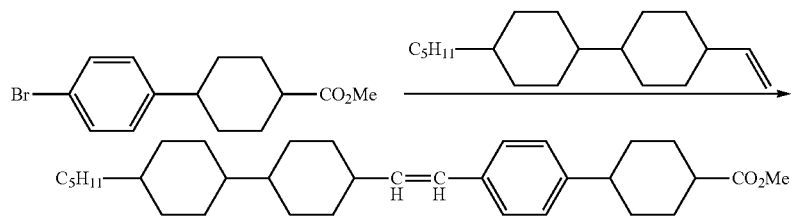

12.8 g (60.1 mmol) of potassium phosphate, 14.3 g (48 mmol) of 4-(4-bromophenyl)cyclohexanecarboxylic acid methyl ester of Example 1-1 and 10.5 g (40 mmol) of 1-pentyl-vinylbicyclohexane were dissolved in N,N-dimethylacetamide (DMA). 180 mL of the resulting solution was poured to flask filled with Argon gas. Then, 0.17 g (catalytic amount) of palladium acetate was added to the flask and reacted in oil bath at 120° C. for 32 hours. After reaction, 100 mL of distilled water was added to the reaction mixture and extracted by ethyl acetate. The aqueous layer was extracted by chloroform. The organic layer was dried by $Na_2SO_4$, concentrated under reduced pressure, and then recrystallized from ethanol to obtain 12.3 g (64%) of 4-{4-[2-(4-pentyl-bicyclohexyl)-ethenyl]-phenyl}cyclohexane carboxylic acid methyl ester.

Example 1-3

Trans-4-{4-[2-(4-pentyl-bicyclohexyl)ethenyl]phenyl}cyclohexane carbaldehyde

Reaction scheme 6

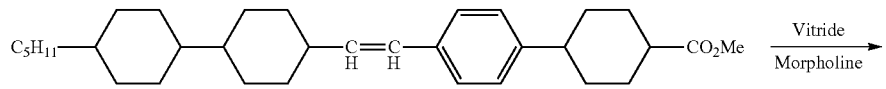

-continued

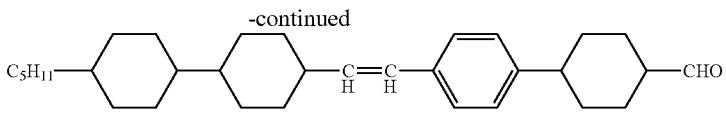

Vitride (3.3M in toluene, 10 eq, 26.6 ml, 87.7 mmol) was added with syringe to a flask filled with Argon gas at 0° C., and morpholine (10 eq, 7.67 ml, 87.7 mmol) was added slowly dropwise with syringe. Then, toluene (a half of morpholine mmol, 44 ml) was added with syringe dropwise to produce vitride solution. 88 ml of a solution including cyclohexane carboxylate compound (4.20 g, 8.77 mmol) obtained in Example 1-2 dissolved in toluene was added to another 2-neck flask filled with argon gas, and the vitride solution was added slowly dropwise at −70° C. for 30 minutes. Then, the reacting solution was stirred with maintaining −30 to −50° C. for 6 hours and then water was added very slowly dropwise to the flask. 1M HCl was slowly added to the flask to neutralize the reaction solution. Resulting white precipitate was filtered under reduced pressure and the filtrate was extracted by toluene (20 ml×three times). The organic layer was collected, washed by distilled water (10 ml×two times), dried with anhydrous $Na_2SO_4$ and concentrated under reduced pressure. The resulting residue was purified by column chromatography (hexane:ether=5:1, Rf=0.32) to produce 1.69 g (43%) of trans-4-{4-[2-(4-pentyl-bicyclohexyl)ethenyl]phenyl}cyclohexane carbaldehyde.

Example 1-4

1-[2-(4-pentyl-bicyclohexyl)ethenyl]-4-(4-vinylcyclohexyl)benzene

Reaction scheme 7

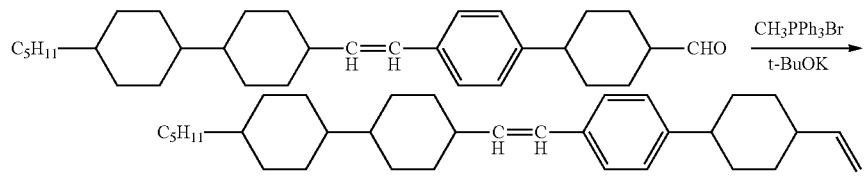

Potassium tert-butoxide (1.0 eq, 0.44 g, 3.62 mmol) was added slowly with stirring for 3 minutes to 32 ml of solution including methyltriphenylphosphonium bromide (1.2 eq, 1.55 g, 4.33 mmol) dissolved in THF. Then, the solution was stirred for 30 minutes at a room temperature and THF solution (35 ml) of trans-4-{4-[2-(4-pentyl-bicyclohexyl)ethenyl] phenyl}cyclohexane carbaldehyde (1.62 g, 3.62 mmol) obtained in Example 1-3 was added slowly dropwise for 10 minutes to reaction mixture, and then was stirred at a room temperature for 24 hours.

The white precipitate was filtered under reduced pressure and the filtrate was washed by water (100 ml) and extracted with ether (20 ml×1 time). The aqueous layer was extracted by chloroform (20 ml×3 times). The organic layer was collected, washed by water (30 ml×2 times) and salt water (brine, 20 ml×1 time), dried by anhydrous $Na_2SO_4$ and concentrated under reduced pressure. The obtained residue was purified by column chromatography (silica gel, hexane, Rf=0.36). The remnant was dissolved in chloroform (3 ml), and cold ethanol (8 ml) was added dropwise by spuit and stirred with glass rod to recrystallize 1.42 g (88%) of 1-[2-(4-pentyl-bicyclohexyl) ethenyl]-4-(4-vinyl-cyclohexyl)benzene.

$^1$H NMR δ0.87 (t, 3H), 0.94-2.00 (m, 37H), 2.43 (tt, 1H), 4.91 (d, 1H), 5.00 (d, 1H), 5.82 (ddd, 1H), 6.10 (dd, 1H), 6.30 (d, 1H), 7.20 (d, 2H), 7.27 (d, 2H)

M+=446 a phase transition temperature: C, 239.2° C. N>300° C. I

Example 2

1-[2-(4-propyl-cyclohexyl)-ethenyl]-4-(4-vinyl-cyclohexyl)benzene

Example 2-1

4-{4-[2-(4-propyl-cyclohexyl)-ethenyl]-phenyl}-cyclohexane carboxylic acid methyl ester Reaction scheme 8

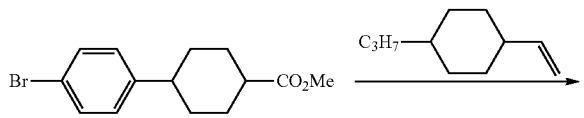

-continued 180 mL of N,N-dimethylacetamide (DMA) solution including 12.8 g (60.1 mmol) of potassium phosphate, 14.3 g (48 mmol) of 4-(4-bromophenyl)cyclohexanecarboxylic acid methyl ester produced in Example 1-1, and 6.09 g (40 mmol) of 1-propyl-4-vinylcyclohexane was poured to flask filled with Argon gas. Then, 0.17 g (catalytic amount) of palladium acetate was added to the flask and reacted in oil bath at 120° C. for 32 hours. After reaction, 100 mL of distilled water was added to the reaction mixture, extracted by ethyl acetate, and then the aqueous layer was extracted by chloroform. The organic layer was dried by $Na_2SO_4$, concentrated under reduced pressure, and then recrystallized from ethanol to obtain 8.8 g (60%) of 4-{4-[2-(4-propyl-cyclohexyl)-ethenyl]-phenyl}cyclohexane carboxylic acid methyl ester.

Example 2-2

Trans-4-{4-[2-(4-propyl-cyclohexyl)ethenyl]
phenyl}cyclohexane carbaldehyde

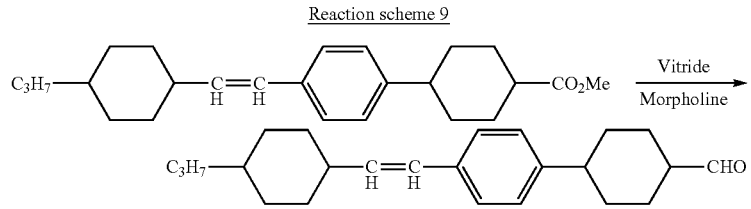

Vitride (3.3M in toluene, 10 eq, 26.6 ml, 87.7 mmol) was added with syringe to a flask filled with Argon gas at 0° C., and morpholine (10 eq, 7.67 ml, 87.7 mmol) was added slowly dropwise with syringe. Then, toluene (a half of morpholine mmol, 44 ml) was added dropwise with syringe to produce vitride solution. 88 ml of a solution including cyclohexane carboxylate compound (4.20 g, 8.77 mmol) obtained in Example 1-2 in toluene a solution was added to another 2-neck flask filled with argon gas, and vitride solution was added slowly dropwise at −70° C. for 30 minutes. Then, the solution was stirred with maintaining −30 to −50° C. for 6 hours and water was added very slowly dropwise to the flask. 1M HCl was slowly added to the flask to neutralize the reaction solution. White precipitate was filtered under reduced pressure and the filtrate was extracted by toluene (20 ml×three times). The organic layer was collected, washed by distilled water (10 ml×two times), dried with anhydrous $Na_2SO_4$ and concentrated under reduced pressure. The obtained residue was purified by column chromatography (hexane:ether=5:1, Rf=0.32) to produce 1.34 g (45%) of trans-4-{4-[2-(4-propyl-cyclohexyl)ethenyl]phenyl}cyclohexane carbaldehyde.

Example 2-3

1-[2-(4-propyl-cyclohexyl)ethenyl]-4-(4-vinylcyclohexyl)benzene

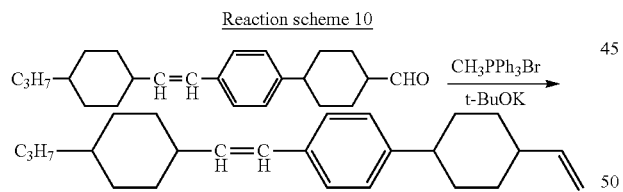

Potassium tert-butoxide (1.0 eq, 0.44 g, 3.62 mmol) was added slowly with stirring for 3 minutes to 32 ml of solution including methyltriphenylphosphonium bromide (1.2 eq, 1.55 g, 4.33 mmol) dissolved in THF. Then, the solution was stirred for 30 minutes at a room temperature and THF solution (35 ml) of trans-4-{4-[2-(4-propyl-cyclohexyl)ethenyl]phenyl}cyclohexane carbaldehyde (1.23 g, 3.62 mmol) obtained in Example 2-2 was added slowly dropwise for 10 minutes to reaction mixture, and then was stirred at a room temperature for 24 hours.

The white precipitate was filtered under reduced pressure and the filtrate was washed by water (100 ml) and extracted with ether (20 ml×1 time). The aqueous layer was extracted by chloroform (20 ml×3 times). The organic layer was collected, washed by water (30 ml×2 times) and salt water (brine, 20 ml×1 time), dried by anhydrous $Na_2SO_4$ and concentrated under reduced pressure. The obtained residue was purified by column chromatography (silica gel, hexane, Rf=0.36). The remnant was dissolved in chloroform (3 ml), and cold ethanol (8 ml) was added dropwise by spuit and stirred to with glass rod recrystallize 0.98 g (80%) of 1-[2-(4-propyl-cyclohexyl)ethenyl]-4-(4-vinyl-cyclohexyl)benzene.

$^1$H NMR δ0.87 (t, 3H), 0.93-1.92 (m, 37H), 2.43 (tt, 1H), 4.94 (d, 1H), 5.02 (d, 1H), 5.81 (ddd, 1H), 6.14 (dd, 1H), 6.33 (d, 1H), 7.12 (d, 2H), 7.27 (d, 2H)

M+=336

A phase transition temperature: C, 101.2° C. N, 199.0° C.I

Example 3

1-[2-(4-propyl-bicyclohexyl)-ethenyl]-4-(4-vinyl-cyclohexyl)benzene

Example 3-1

4-{4-[2-(4-propyl-bicyclohexyl)-ethenyl]-phenyl}-cyclohexane carboxylic acid methyl ester

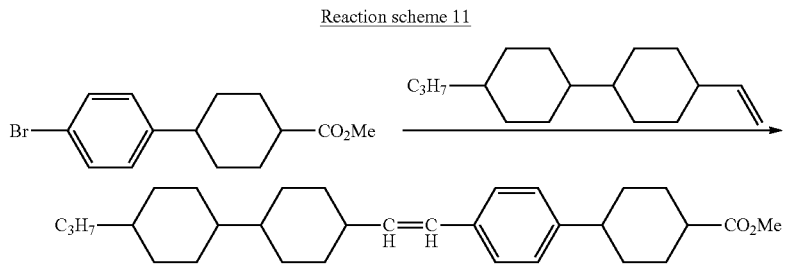

180 mL of N,N-dimethylacetamide (DMA) solution including 12.8 g (60.1 mmol) of potassium phosphate, 14.3 g (48 mmol) of 4-(4-bromophenyl)cyclohexanecarboxylic acid methyl ester produced in Example 1-1, and 9.38 g (40 mmol) of 1-propyl-4-vinyl-bicyclohexane was poured to flask filled with Argon gas. Then, 0.17 g (catalytic amount) of palladium acetate was added to the flask and reacted in oil bath at 120° C. for 32 hours. After reaction, 100 mL of distilled water was added to the reaction mixture, extracted by ethyl acetate, and then the aqueous layer was extracted by chloroform. The organic layer was dried by $Na_2SO_4$, concentrated under reduced pressure, and then recrystallized from ethanol to obtain 10.5 g (58%) of 4-{4-[2-(4-propyl-bicyclohexyl)-ethenyl]phenyl}cyclohexanecarboxylic acid methyl ester.

Example 3-2

Trans-4-{4-[2-(4-propyl-bicyclohexyl)ethenyl]phenyl}cyclohexane carbaldehyde

Reaction scheme 12

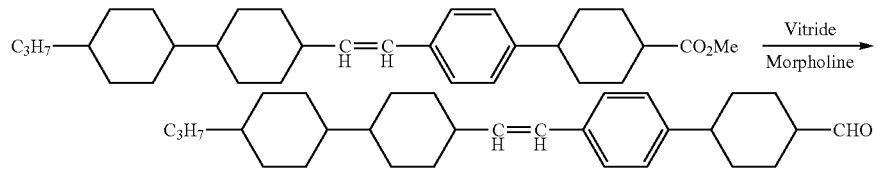

Vitride (3.3M in toluene, 10 eq, 26.6 ml, 87.7 mmol) was added with syringe to a flask filled with Argon gas at 0° C., and morpholine (10 eq, 7.67 ml, 87.7 mmol) was added slowly dropwise with syringe. Then, toluene (a half of morpholine mmol, 44 ml) was added dropwise with syringe to produce vitride solution. 88 ml of a solution including cyclohexane carboxylate compound (4.20 g, 8.77 mmol) obtained in Example 3-1 in toluene a solution was added to another 2-neck flask filled with argon gas, and vitride solution was added slowly dropwise at −70° C. for 30 minutes. Then, the solution was stirred with maintaining −30 to −50° C. for 6 hours and water was added verly slowly dropwise to the flask. 1M HCl was slowly added to the flask to neutralize the reaction solution. White precipitate was filtered under reduced pressure and the filtrate was extracted by toluene (20 ml×three times). The organic layer was collected, washed by distilled water (10 ml×two times), dried with anhydrous $Na_2SO_4$ and concentrated under reduced pressure. The obtained residue was purified by column chromatography (hexane:ether=5:1, Rf=0.32) to produce 1.10 g (30%) of trans-4-{4-[2-(4-propylbicyclohexyl)ethenyl]phenyl}cyclohexane carbaldehyde.

Example 3-3

1-[2-(4-propyl-bicyclohexyl)ethenyl]-4-(4-vinylcyclohexyl)benzene

Reaction scheme 13

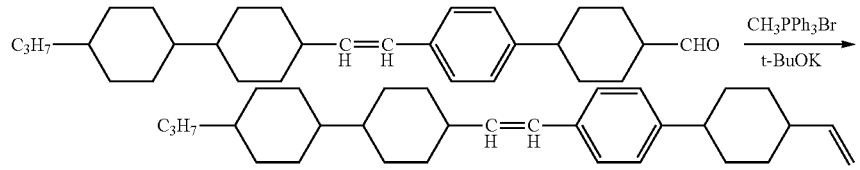

Potassium tert-butoxide (1.0 eq, 0.44 g, 3.62 mmol) was added slowly with stirring for 3 minutes to 32 ml of solution including methyltriphenylphosphonium bromide (1.2 eq, 1.55 g, 4.33 mmol) dissolved in THF. Then, the soltion was stirred for 30 minutes at a room temperature and THF solution (35 ml) of trans-4-{4-[2-(4-propyl-bicyclohexyl)ethenyl]phenyl}cyclohexane carbaldehyde (1.52 g, 3.62 mmol) obtained in Example 3-2 was added slowly dropwise for 10 minutes to reaction mixture, and then was stirred at a room temperature for 24 hours. The white precipitate was filtered under reduced pressure and the filtrate was washed by water (100 ml) and extracted with ether (20 ml×1 time). The aqueous layer was extracted by chloroform (20 ml×3 times). The organic layer was collected, washed by water (30 ml×2 times) and salt water (brine, 20 ml×1 time), dried by anhydrous $Na_2SO_4$ and concentrated under reduced pressure. The obtained residue was purified by column chromatography (silica gel, hexane, Rf=0.36). The remnant was dissolved in chloroform (3 ml), and cold ethanol (8 ml) was added dropwise by spuit and stirred with glass rod to recrystallize 0.85 g (56%) of 1-[2-(4-propyl-bicyclohexyl)ethenyl]-4-(4-vinyl-cyclohexyl)benzene.

$^1$H NMR δ0.87 (t, 3H), 1.00-1.92 (m, 37H), 2.44 (tt, 1H), 4.90 (d, 1H), 4.98 (d, 1H), 5.82 (ddd, 1H), 6.11 (dd, 1H), 6.30 (d, 1H), 7.14 (d, 2H), 7.27 (d, 2H)

M+=418

A phase transition temperature: C, 197.2° C. I

Example 4

1-[2-(4-pentyl-cyclohexyl)-ethenyl]-4-(4-vinyl-cyclohexyl)benzene

Example 4-1

4-{4-[2-(4-pentyl-cyclohexyl)-ethenyl]-phenyl}-cyclohexane carboxylic acid methyl ester Reaction scheme 14

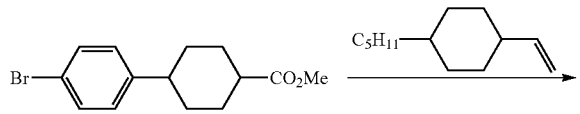

-continued

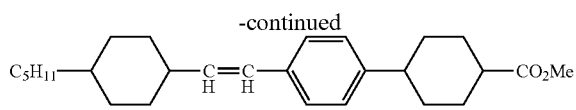

180 mL of N,N-dimethylacetamide (DMA) solution including 12.8 g (60.1 mmol) of potassium phosphate, 14.3 g (48 mmol) of 4-(4-bromophenyl)cyclohexanecarboxylic acid methyl ester produced in Example 1-1, and 8.33 g (40 mmol) of 1-pentyl-4-vinyl-cyclohexane was poured to flask filled with Argon gas. Then, 0.17 g (catalytic amount) of palladium acetate was added to the flask and reacted in oil bath at 120° C. for 32 hours. After reaction, 100 mL of distilled water was added to the reaction mixture, extracted by ethyl acetate, and then the aqueous layer was extracted by chloroform. The organic layer was dried by $Na_2SO_4$, concentrated under reduced pressure, and then recrystallized from ethanol to obtain 9.8 g (62%) of 4-{4-[2-(4-pentyl-cyclohexyl)-ethenyl]-phenyl}cyclohexane carboxylic acid methyl ester.

Example 4-2

Trans-4-{4-[2-(4-pentyl-cyclohexyl)ethenyl] phenyl}cyclohexane carbaldehyde

Reaction scheme 15

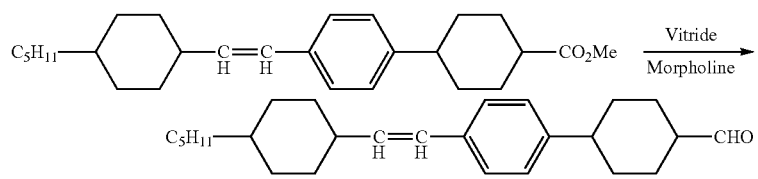

Vitride (3.3M in toluene, 10 eq, 26.6 ml, 87.7 mmol) was added with syringe to a flask filled with Argon gas at 0° C., and morpholine (10 eq, 7.67 ml, 87.7 mmol) was added slowly dropwise with syringe. Then, toluene (a half of morpholine mmol, 44 ml) was added dropwise with syringe to produce vitride solution. 88 ml of a solution including cyclohexane carboxylate compound (3.48 g, 8.77 mmol) obtained in Example 4-1 in toluene a solution was added to another 2-neck flask filled with argon gas, and vitride solution was added slowly dropwise at −70° C. for 30 minutes. Then, the solution was stirred with maintaining −30 to −50° C. for 6 hours and water was added very slowly dropwise to the flask. 1M HCl was slowly added to the flask to neutralize the reaction solution. White precipitate was filtered under reduced pressure and the filtrate was extracted by toluene (20 ml×three times). The organic layer was collected, washed by distilled water (10 ml×two times), dried with anhydrous $Na_2SO_4$ and concentrated under reduced pressure. The obtained residue was purified by column chromatography (hexane:ether=5:1, Rf=0.32) to produce 1.77 g (55%) of trans-4-{4-[2-(4-pentylcyclohexyl)ethenyl] phenyl}cyclohexane carbaldehyde.

Example 4-3

1-[2-(4-pentyl-cyclohexyl)ethenyl]-4-(4-vinylcyclohexyl)benzene

Reaction scheme 16

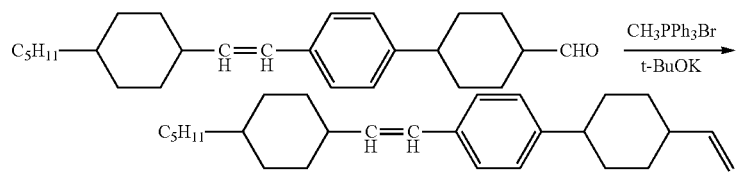

Potassium tert-butoxide (1.0 eq, 0.44 g, 3.62 mmol) was added slowly with stirring for 3 minutes to 32 ml of solution including methyltriphenylphosphonium bromide (1.2 eq, 1.55 g, 4.33 mmol) dissolved in THF. Then, the solution was stirred for 30 minutes at a room temperature and THF solution (35 ml) of trans-4-{4-[2-(4-pentyl-cyclohexyl)ethenyl] phenyl}cyclohexane carbaldehyde (1.32 g, 3.62 mmol) obtained in Example 4-2 was added slowly dropwise for 10 minutes to reaction mixture, and then was stirred at a room temperature for 24 hours. The white precipitate was filtered under reduced pressure and the filtrate was washed by water (100 ml) and extracted with ether (20 ml×1 time) The aqueous layer was extracted by chloroform (20 ml×3 times). The organic layer was collected, washed by water (30 ml×2 times) and salt water (brine, 20 ml×1 time), dried by anhydrous $Na_2SO_4$ and concentrated under reduced pressure. The obtained residue was purified by column chromatography (silica gel, hexane, Rf=0.36). The remnant was dissolved in chloroform (3 ml), and cold ethanol (8 ml) was added dropwise by pipette and stirred with glass rod to recrystallize 1.02 g (77%) of 1-[2-(4-pentyl-cyclohexyl)ethenyl]-4-(4-vinyl-cyclohexyl)benzene.

$^1$H NMR δ0.87 (t, 3H), 0.90-2.03 (m, 27H), 2.44 (tt, 1H), 4.91 (dd, 1H), 5.02 (dd, 1H), 5.81 (ddd, 1H), 6.10 (dd, 1H), 6.30 (d, 1H), 7.13 (d, 2H), 7.27 (d, 2H)

M+=364

A phase transition temperature: C, 108.3° C. N, 204.3° C. I

Example 5

1-[2-(4-propyl-cyclohexyl)ethyl]-4-(4-vinyl-cyclohexyl)benzene

Preparation of Chemical Formula 2 in Reaction Scheme 2

Example 5-1

4-[4-[2-(4-propyl-cyclohexyl)-ethenyl]-phenyl}-cyclohexane carboxylic acid methyl ester was prepared according to the substantially same method of Example 1-2, except that 1-propyl-4-vinyl-cyclohexane was used instead of 1-pentyl-4-vinyl-bicyclohexane.

That is, 180 mL of N,N-dimethylacetamide (DMA) solution including 12.8 g (60.1 mmol) of potassium phosphate, 14.3 g (48 mmol) of 4-(4-bromophenyl)cyclohexanecarboxylic acid methyl ester of Example 1-1, and 6.09 g (40 mmol) of 1-propyl-4-vinyl-cyclohexane was poured to flask filled with Argon gas.

Then, 0.17 g (catalytic amount) of palladium acetate was added to the flask and reacted in oil bath at 120° C. for 32 hours. After reaction, the resulting product was added by 100 mL of distilled water, extracted by ethyl acetate, and then the aqueous layer was extracted by chloroform. The organic layer was dried by Na$_2$SO$_4$, concentrated under reduced pressure, and then recrystallized by ethanol to obtain 8.8 g (60%) of 4-{4-[2-(4-propyl-cyclohexyl)-ethenyl]-phenyl}cyclohexane carboxylic acid methyl ester.

Example 5-2

4-{4-[2-(4-propyl-cyclohexyl)-ethyl]-phenyl}-cyclohexane carboxylic acid methyl ester Reaction scheme 17

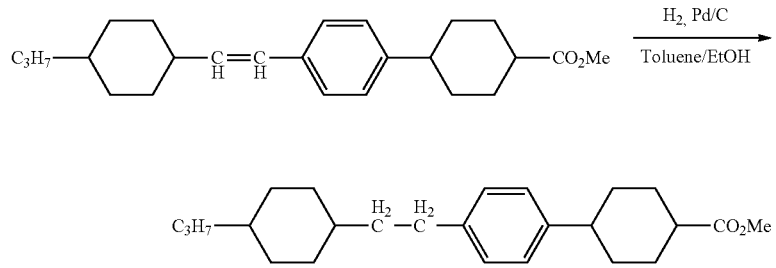

6.41 g (17.4 mmol) of 4-{4-[2-(4-propyl-cyclohexyl)-ethenyl]-phenyl}cyclohexane carboxylic acid methyl ester produced in Example 5-1 was dissolved in a mixture of toluene and ethanol (1:1 by volume %). 0.4 g of Pd/C was added to 200 mL of the resultant solution and reacted in hydrogenation reactor for 12 hours. After reaction, Pd/C was removed by filtration and concentrated under reduced pressure to obtain 5.2 g (80%) of 4-{4-[2-(4-propyl-cyclohexyl)-ethyl]-phenyl}-cyclohexane carboxylic acid methyl ester.

Example 5-3

Trans-4-{4-[2-(4-propyl-cyclohexyl)-ethyl]-phenyl}-cyclohexanecarbaldehyde

Reaction scheme 18

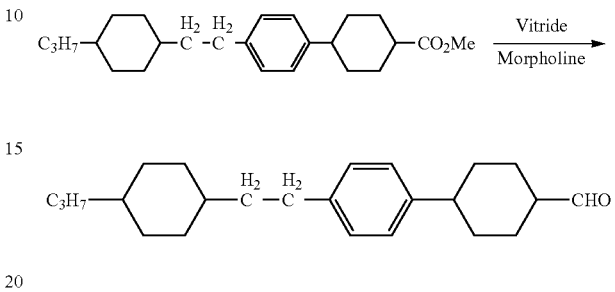

Vitride (3.3M in toluene, 19 mL, 62.7 mmol) was added with syringe to a flask filled with Argon gas, adjusted to 0° C., and morpholine (5.5 ml, 62.7 mmol) was added slowly dropwise with syringe. Then, toluene (31 ml) was added dropwise with syringe to produce vitride solution. 63 ml of a solution including 4-{4-[2-(4-propyl-cyclohexyl)-ethyl]-phenyl}-cyclohexane carboxylic acid methyl ester (2.3 g, 6.27 mmol) obtained in Example 5-2 in toluene a solution was added to another flask filled with argon gas, and vitride solution was added slowly dropwise at −70° C. for 30 minutes. Then, the solution was stirred with maintaining −30 to −50° C. for 6 hours and water was added very slowly dropwise to the flask. After reaction, 1M HCl was slowly added to the flask to neutralize the reaction solution. White precipitate was filtered under reduced pressure and the filtrate was extracted by toluene (20 ml×three times). The organic layer was collected, washed by distilled water (10 ml×two times), dried with anhydrous Na$_2$SO$_4$ and concentrated under reduced pressure. The obtained residue was purified by column chromatography (hexane:ether=5:1, Rf=0.32) to produce 0.96 g (45%) of trans-4-{4-[2-(4-propyl-cyclohexyl)ethyl]phenyl}cyclohexane carbaldehyde.

Example 5-4

1-[2-(4-propyl-cyclohexyl)-ethyl]-4-(4-vinyl-cyclohexyl)-benzene

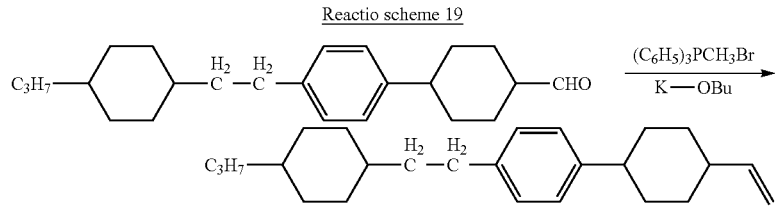

Reactio scheme 19

Potassium tert-butoxide (0.86 g, 7.01 mmol) was added slowly with stirring for 3 minutes to 32 ml of solution including methyltriphenylphosphonium bromide (3 g, 8.41 mmol) dissolved in THF. Then, the solution was stirred for 30 minutes at a room temperature and THF solution (25 ml) of 4-{4-[2-(4-propyl-cyclohexyl)ethyl]phenyl}cyclohexane carbaldehyde (2.39 g, 7.01 mmol) was added slowly dropwise to reaction mixture, and then was stirred at a room temperature for 24 hours. The precipitate was filtered under reduced pressure and the filtrate was washed by water (100 ml) and extracted with ether (20 ml×1 time). The aqueous layer was extracted by chloroform (20 ml×3 times). The organic layer was collected, washed by NaCl solution, dried by anhydrous $Na_2SO_4$ and concentrated under reduced pressure. The obtained residue was purified by column chromatography (silica gel, hexane, Rf=0.36) and was recrystallized by addition of chloroform and ethanol to obtain 1.9 g (80%) of 1-[2-(4-propyl-cyclohexyl)ethyl]-4-(4-vinyl-cyclohexyl)benzene.

$^1$H NMR δ0.86 (t, 3H), 0.90-2.00 (m, 25H), 2.43 (tt, 1H), 2.54-2.60 (m, 2H), 4.91 (dd, 1H), 5.00 (d, 1H), 5.82 (ddd, 1H), 7.10 (s, 4H)

M+=338

A phase transition temperature: C, 45.7° C. S 73.2° C. N, 119.5° C. I

Example 6

1-[2-(4-pentylcyclohexyl)ethyl]-4-(4-vinylcyclohexyl)benzene

Example 6-1

4-[4-[2-(4-pentyl-cyclohexyl)-ethenyl]-phenyl}-cyclohexane carboxylic acid methyl ester was prepared according to the substantially same method of Example 1-2, except that 1-pentyl-4-vinyl-cyclohexane was used instead of 1-pentyl-4-vinyl-bicyclohexane.

That is, 180 mL of N,N-dimethylacetamide (DMA) solution including 12.8 g (60.1 mmol) of potassium phosphate, 14.3 g (48 mmol) of 4-(4-bromophenyl)cyclohexanecarboxylic acid methyl ester of Example 1-1, and 8.34 g (40 mmol) of 1-propyl-4-vinyl-cyclohexane was poured to flask filled with Argon gas.

Then, 0.17 g (catalytic amount) of palladium acetate was added to the flask and reacted in oil bath at 120° C. for 32 hours. After reaction, the resulting product was added by 100 mL of distilled water, extracted by ethyl acetate, and then the aqueous layer was extracted by chloroform. The organic layer was dried by $Na_2SO_4$, concentrated under reduced pressure, and then recrystallized by ethanol to obtain 9.8 g (62%) of 4-{4-[2-(4-pentyl-cyclohexyl)-vinyl]-phenyl}cyclohexane carboxylic acid methyl ester.

Example 6-2

4-{4-[2-(4-pentyl-cyclohexyl)-ethyl]-phenyl}-cyclohexane carboxylic acid methyl ester

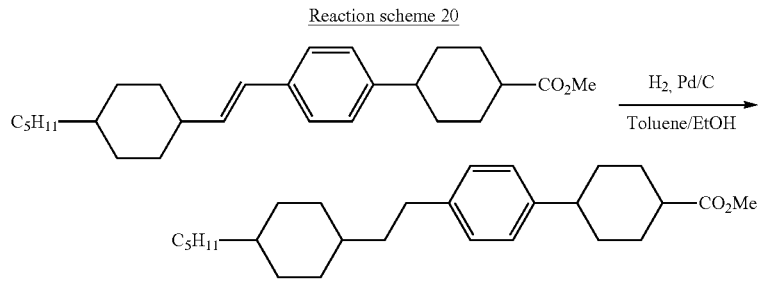

Reaction scheme 20

6.9 g (17.4 mmol) of 4-{4-[2-(4-pentyl-cyclohexyl)-vinyl]-phenyl}cyclohexane carboxylic acid methyl ester produced in Example 6-1 was dissolved in a mixture of toluene and ethanol (1:1 by volume %). 0.4 g of Pd/C was added to 200 mL of the resultant solution and reacted in hydrogenation reactor for 12 hours. After reaction, Pd/C was removed by filtration, concentrated under reduced pressure and recrystallized from chloroform and ethanol to obtain 6.1 g (88%) of 4-{4-[2-(4-pentyl-cyclohexyl)-ethyl]-phenyl}-cyclohexane carboxylic acid methyl ester.

Example 6-3

4-{4-[2-(4-pentyl-cyclohexyl)-ethyl]-phenyl}-cyclohexanecarbaldehyde

Reaction scheme 21

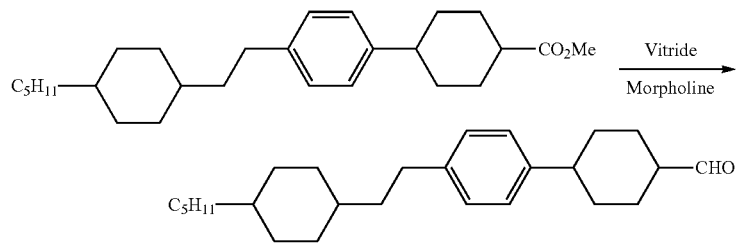

Vitride (3.3M in toluene, 19 mL, 62.7 mmol) was added with syringe to a flask filled with Argon gas, adjusted to 0° C. and morpholine (5.5 ml, 62.7 mmol) was added slowly dropwise with syringe. Then, 31 mL of toluene was added dropwise with syringe to produce vitride solution. 63 ml of a solution including 4-{4-[2-(4-pentyl-cyclohexyl)-ethyl]-phenyl}-cyclohexane carboxylic acid methyl ester (2.5 g, 6.27 mmol) obtained in Example 6-2 in toluene was added to another flask filled with argon gas, and added slowly by the vitride solution dropwise at −70° C. for 30 minutes. Then, the solution was stirred with maintaining −30 to −50° C. for 6 hours and added dropwise by water. 1M HCl was slowly added to the flask to neutralize the reaction solution.

The precipitate was filtered under reduced pressure and the filtrate was extracted by toluene (20 ml×three times). The organic layer was collected, washed by distilled water (10 ml×two times) dried with anhydrous $Na_2SO_4$ and dried under reduced pressure. The obtained remnant was purified by column chromatography (hexane:ether=5:1, Rf=0.32) to produce 1.27 g (55%) of 4-{4-[2-(4-pentyl-cyclohexyl)ethyl]phenyl}cyclohexane carbaldehyde.

Example 6-4

1-[2-(4-pentyl-cyclohexyl)-ethyl]-4-(4-vinyl-cyclohexyl)-benzene

Reaction scheme 22

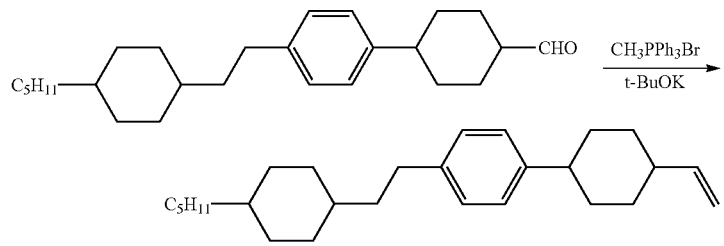

40 ml of solution including methyltriphenylphosphonium bromide (3 g, 8.41 mmol) dissolved in THF In flask was slowly added by potassium tert-butoxide (0.86 g, 7.01 mmol) with stirring for 3 minutes, and then was stirred for 30 minutes at a room temperature. The reaction mixture was added slowly dropwise by THF solution (25 mL) of 4-{4-[2-(4-pentyl-cyclohexyl)ethyl]phenyl}cyclohexane carbaldehyde (2.58 g, 7.01 mmol), and then was stirred at a room temperature for 24 hours.

The precipitate was filtered under reduced pressure and the filtrate was washed by water (100 ml), extracted with ether (20 ml×1 time), and the aqueous layer was extracted by chloroform (20 ml×3 times). The organic layer was collected, washed by NaCl solution, dried by anhydrous $Na_2SO_4$ and concentrated under reduced pressure. The obtained residue was purified with column chromatography (silica gel, hexane, Rf=0.36), and was recrystallized from chloroform and ethanol to obtain 1.98 g (77%) of 1-[2-(4-pentyl-cyclohexyl)ethyl]-4-(4-vinyl-cyclohexyl)benzene.

$^1$H NMR δ0.87 (t, 3H), 0.93-2.00 (m, 29H), 2.43 (tt, 1H), 2.54-2.60 (m, 2H), 4.91 (dd, 1H), 5.00 (d, 1H), 5.82 (ddd, 1H), 7.10 (s, 4H)

M+=366

A phase transition temperature: C, 99.6° C. N, 122.8° C. I

Example 7

1-[2-(4-propyl-bicyclohexyl)ethyl]-4-(4-vinylcyclohexyl)benzene

Example 7-1

4-[4-[2-(4-propyl-bicyclohexyl)-ethenyl]-phenyl}-cyclohexane carboxylic acid methyl ester was prepared according to the substantially same method of Example 1-2, except that 1-propyl-4-vinyl-bicyclohexane was used instead of 1-pentyl-4-vinyl-bicyclohexane.

That is, 180 mL of N,N-dimethylacetamide (DMA) a solution including 12.8 g (60.1 mmol) of potassium phosphate, 14.3 g (48 mmol) of 4-(4-bromophenyl)cyclohexanecarboxylic acid methyl ester of Example 1-1, and 9.38 g (40 mmol) of 1-propyl-4-vinyl-bicyclohexane was poured to flask filled with Argon gas. Then, 0.17 g (catalytic amount) of palladium acetate was added to the flask and reacted in oil bath at 120° C. for 32 hours. After reaction, the resulting product was added by 100 mL of distilled water, extracted by ethyl acetate, and then the aqueous layer was, extracted by chloroform. The organic layer was dried by $Na_2SO_4$, concentrated under reduced pressure, and then recrystallized from ethanol to obtain 10.5 g (58%) of 4-{4-[2-(4-propyl-bicyclohexyl)-ethenyl]-phenyl}cyclohexane carboxylic acid methyl ester.

Example 7-2

4-{4-[2-(4-propyl-bicyclohexyl)-ethyl]-phenyl}-cyclohexane carboxylic acid methyl ester Reaction Scheme 23

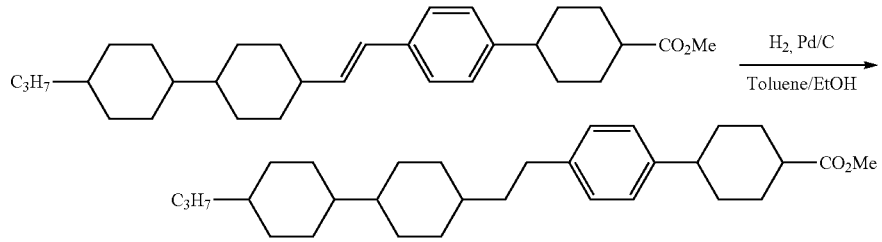

7.8 g (17.4 mmol) of 4-{4-[2-(4-propyl-bicyclohexyl)-ethenyl]-phenyl}cyclohexane carboxylic acid methyl ester produced in Example 7-1 was dissolved in a mixture of toluene and ethanol (1:1 by volume %). 0.4 g of Pd/C was added to 200 mL of the resultant solution and reacted in hydrogenation reactor for 12 hours. After reaction, Pd/C was removed by filtration and the filtrate was concentrated under reduced pressure to obtain 6.8 g (86%) of 4-{4-[2-(4-propyl-bicyclohexyl)-ethyl]-phenyl}-cyclohexane carboxylic acid methyl ester.

Example 7-3

4-{4-[2-4-propyl-bicyclohexyl)-ethyl]-phenyl}-cyclohexanecarboaldehyde

Reaction scheme 24

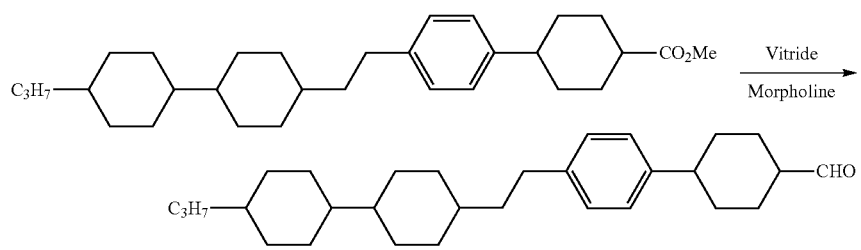

Vitride (3.3M in toluene, 19 mL, 62.7 mmol) was added with syringe to a flask filled with Argon gas, adjusted to 0° C. and morpholine (5.5 ml, 62.7 mmol) was added to the solution slowly dropwise with syringe. Then, 31 mL of toluene was added dropwise with syringe to produce vitride solution.

63 ml of a solution including 4-{4-[2-(4-propyl-bicyclohexyl)-ethyl]-phenyl}-cyclohexane carboxylic acid methyl ester (2.8 g, 6.27 mmol) obtained in Example 7-2 in toluene was added to another flask filled with argon gas, and the vitride solution was added slowly dropwise at −70° C. for 30 minutes. Then, the solution was stirred with maintaining −30 to −50° C. for 6 hours and added by water dropwise. After reaction, 1M HCl was slowly added to the flask to neutralize the reaction solution. The precipitate was filtered under reduced pressure and the filtrate was extracted by toluene (20 ml×three times). The organic layer was collected, washed by distilled water (10 ml×two times) dried with anhydrous $Na_2SO_4$ and dried under reduced pressure. The obtained remnant was purified by column chromatography (hexane:ether=5:1, Rf=0.32) to produce 0.80 g (30%) of 4-{4-[2-(4-propyl-bicyclohexyl)ethyl]phenyl}cyclohexane carbaldehyde.

Example 7-4

1-[2-(4-propyl-bicyclohexyl)-ethyl]-4-(4-vinyl-cyclohexyl)-benzene

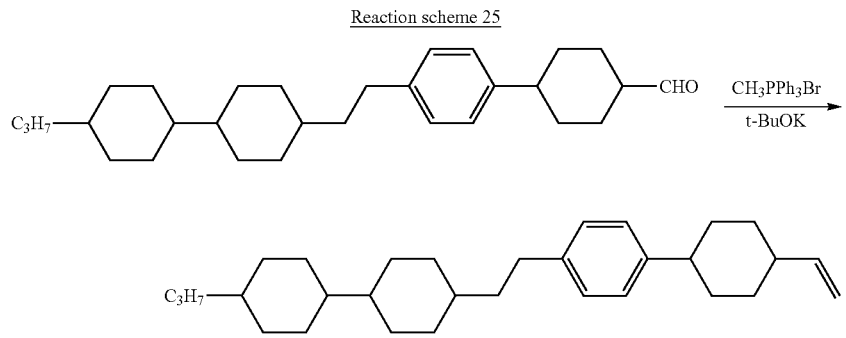

Reaction scheme 25

40 mL of solution including methyltriphenylphosphonium bromide (3 g, 8.41 mmol) dissolved in THF In flask was slowly added by potassium tert-butoxide (0.86 g, 7.01 mmol) with stirring for 3 minutes, and then was stirred for 30 minutes at a room temperature. The reaction mixture was added slowly dropwise by THF solution (25 mL) of 4-{4-[2-(4-propyl-bicyclohexyl)ethyl]phenyl}cyclohexane carbaldehyde (2.96 g, 7.01 mmol), and then was stirred at a room temperature for 24 hours.

The precipitate was filtered under reduced pressure and the filtrate was washed by water (100 ml), extracted with ether (20 ml×1 time), and the aqueous layer was extracted by chloroform (20 ml×3 times). The organic layer was collected, washed by NaCl solution, dried by anhydrous $Na_2SO_4$ and concentrated under reduced pressure. The obtained remnant was purified with column chromatography (silica gel, hexane, Rf=0.36), and was recrystallized by addition of chloroform and ethanol to obtain 1.65 g (56%) of 1-[2-(4-propyl-bicyclohexyl)ethyl]-4-(4-vinyl-cyclohexyl)benzene.

$^1$H NMR δ0.86 (t, 3H), 0.90-2.00 (m, 35H), 2.43 (tt, 1H), 2.54-2.59 (m, 2H), 4.91 (dd, 1H), 5.00 (d, 1H), 5.82 (ddd, 1H), 7.10 (s, 4H)

M+=420 a phase transition temperature: C, 214.6° C. N, 260.3° C. I

Example 8

1-[2-(4-pentyl-bicyclohexyl)ethyl]-4-(4-vinylcyclohexyl)benzene

Example 8-1

4-[4-[2-(4-pentyl-bicyclohexyl)-ethenyl]-phenyl]-cyclohexane carboxylic acid methyl ester was prepared according to the substantially same method of Example 1-2.

That is, 180 mL of N,N-dimethylacetamide (DMA) a solution including 12.8 g (60.1 mmol) of potassium phosphate, 14.3 g (48 mmol) of 4-(4-bromophenyl)cyclohexanecarboxylic acid methyl ester of Example 1-1, and 10.5 g (40 mmol) of 1-pentyl-4-vinyl-bicyclohexane was poured to flask filled with Argon gas.

Then, 0.17 g (catalytic amount) of palladium acetate was added to the flask and reacted in oil bath at 120° C. for 32 hours. After reaction, the resulting product was added by 100 mL of distilled water, extracted by ethyl acetate, and then the aqueous layer was extracted by chloroform. The organic layer was dried by $Na_2SO_4$, concentrated under reduced pressure, and then recrystallized by ethanol to obtain 12.3 g (64%) of 4-{4-[2-(4-pentyl-bicyclohexyl)-vinyl]-phenyl}cyclohexane carboxylic acid methyl ester.

Example 8-2

4-{4-[2-(4-pentyl-bicyclohexyl)-ethyl]-phenyl}-cyclohexanecarboxylic acid methyl ester Reaction scheme 26

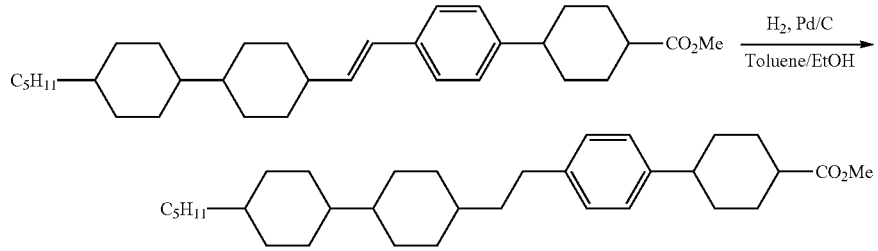

8.3 g (17.4 mmol) of 4-{4-[2-(4-pentyl-bicyclohexyl)-ethenyl]-phenyl}cyclohexane carboxylic acid methyl ester produced in Example 8-1 was dissolved in a mixture of toluene and ethanol (1:1 by volume %). 0.4 g of Pd/C was added to 200 mL of the resultant solution and reacted in hydrogenation reactor for 12 hours. After reaction, Pd/C was removed by filtration and concentrated under reduced pressure to obtain 7.5 g (90%) of 4-{4-[2-(4-pentyl-bicyclohexyl)-ethyl]-phenyl}-cyclohexane carboxylic acid methyl ester.

Example 8-3

4-{4-[2-(4-pentyl-bicyclohexyl)-ethyl]-phenyl}-cyclohexanecarbaldehyde

Reaction scheme 27

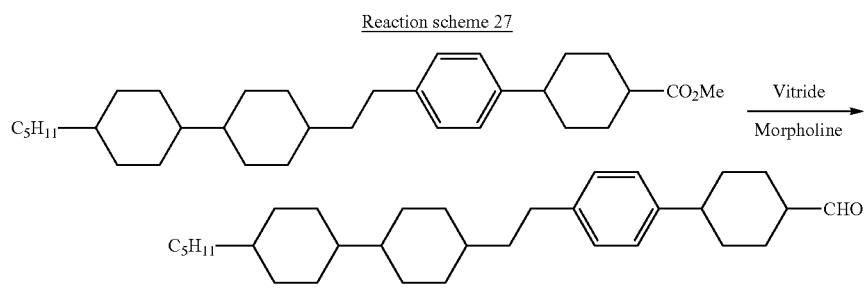

Vitride (3.3M in toluene, 19 mL, 62.7 mmol) was added with syringe to a flask filled with Argon gas, adjusted to 0° C. and morpholine (5.5 ml, 62.7 mmol) was added slowly dropwise with syringe. Then, 31 mL of toluene was added with syringe dropwise to produce vitride solution.

63 ml of a solution including 4-{4-[2-(4-pentyl-bicyclohexyl)-ethyl]-phenyl}-cyclohexane carboxylic acid methyl ester (3.0 g, 6.27 mmol) obtained in Example 8-2 in toluene a solution was added to another flask filled with argon gas, and added slowly by the vitride solution dropwise at −70° C. for 30 minutes. Then, the solution was stirred with maintaining −30 to −50° C. for 6 hours and added by water dropwise. After reaction, 1M HCl was slowly added to the flask to neutralize the reaction solution.

The precipitate was filtered under reduced pressure and the filtrate was extracted by toluene (20 ml×three times). The organic layer was collected, washed by distilled water (10 ml×two times), dried with anhydrous Na$_2$SO$_4$ and dried under reduced pressure. The obtained residue was purified by column chromatography (hexane:ether=5:1, Rf=0.32) to produce 1.33 g (47%) of 4-{4-[2-(4-pentyl-bicyclohexyl)ethyl]phenyl}cyclohexane carbaldehyde.

Example 8-4

1-[2-(4-pentyl-bicyclohexyl)-ethyl]-4-(4-vinyl-cyclohexyl)-benzene

Reaction scheme 28

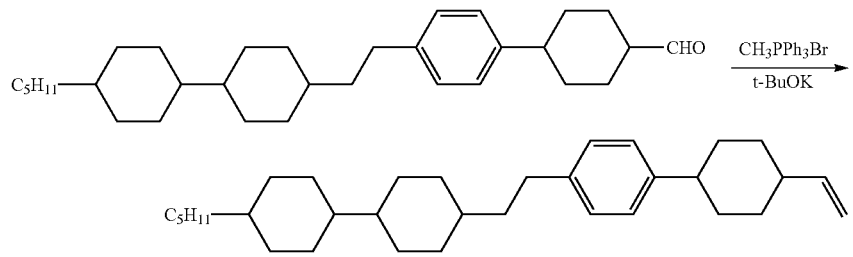

40 mL of solution including methyltriphenylphosphonium bromide (3 g, 8.41 mmol) dissolved in THF In flask was slowly added by potassium tert-butoxide (0.86 g, 7.01 mmol) with stirring for 3 minutes, and then was stirred for 30 minutes at a room temperature. The reaction mixture was added slowly dropwise by THF solution (25 mL) of 4-{4-[2-(4-pentyl-bicyclohexyl)ethyl]phenyl}cyclohexane carbaldehyde (3.16 g, 7.01 mmol), and then was stirred at a room temperature for 24 hours.

The precipitate was filtered under reduced pressure and the filtrate was washed by water (100 ml), extracted with ether (20 ml×1 time), and the aqueous layer was extracted by chloroform (20 ml×3 times). The organic layer was collected, washed by NaCl solution, dried by anhydrous Na$_2$SO$_4$ and concentrated under reduced pressure. The obtained residue was purified with column chromatography (silica gel, hexane, Rf=0.36), and was recrystallized by addition of chloroform and ethanol to obtain 2.6 g (82%) of 1-[2-(4-pentyl-bicyclohexyl)ethyl]-4-(4-vinyl-cyclohexyl)benzene.

$^1$H NMR δ0.88 (t, 3H), 0.91-2.01 (m, 39H), 2.44 (tt, 1H), 2.54-2.60 (m, 2H), 4.92 (dd, 1H), 5.00 (d, 1H), 5.82 (ddd, 1H), 7.10 (s, 4H)

M+=448

A phase transition temperature: C, 236.06° C. N, 255.1° C. I

Example 9

1-[2-(4-propylcyclohexyl)ethyl]-4-(4-vinylcyclohexyl)benzene

Preparation of Chemical Formula 2 in Reaction Scheme 3

Example 9-1

8-(4-bromophenyl)-1,4-dioxaspiro[4.5]decane-8-ol

Reaction scheme 29

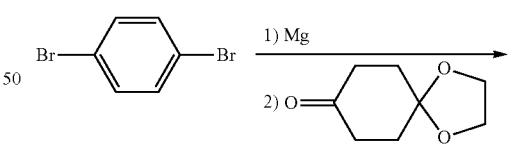

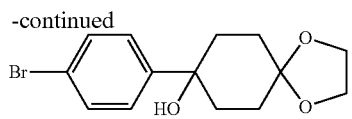

Magnesium (0.60 g, 24.6 mmol) and THF (5 ml) were added to 2-neck flask, and the reaction was initiated with addition of small amount of THF (25 ml) a solution including 1,4-dibromobenzene (5.30 g, 22.4 mmol). Then, the remaining THF solution including 1,4-dibromobenzene was slowly added dropwise with maintaining at 20-25° C. and was stirred for 2 hours. THF solution (8 ml) of 1,4-Dioxaspiro[4.5]decan-8-one (2.60 g, 17.0 mmol) was added slowly dropwise with maintaining 10-15° C., warmed to a room temperature and then stirred for 24 hours at a room temperature. The reacting solution was poured to $NH_4Cl$ aqueous solution (50 ml), and extracted by toluene (50 ml×3 time). The organic layer was washed by distilled water (20 ml×2 times) and concentrated under reduced pressure concentrate to obtain 8-(4-bromophenyl)-1,4-dioxaspiro[4.5]decane-8-ol (9.30 g).

Example 9-2

8-(4-bromophenyl)-1,4-dioxaspiro[4.5]dec-7-en

Reaction scheme 30

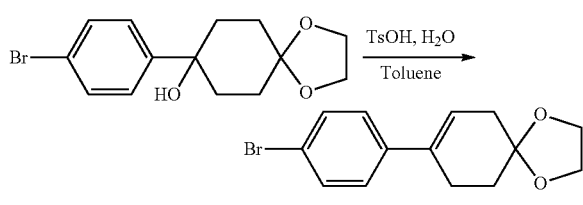

Bromine compound (9.30 g, 29.7 mmol) was dissolved in toluene (50 ml) and refluxed with addition of p-toluenesulfonic acid monohydrate (0.03 g) at 110° C. for 4 hours. The reacting solution was washed by $Na_2CO_3$ (30 ml×2 times) and saturated NaCl aqueous solution (30 ml×2 time) sequentially. The organic layer was concentrated under reduced pressure to produce yellow crystal. The yellow crystal was recrystallized by ethanol to obtain 8-(4-bromophenyl)-1,4-dioxaspiro[4.5]dec-7-en (6.60 g, 77%).

Example 9-3

8-{4-[(E)-2-4-propylcyclohexyl)ethenyl]phenyl}-1,
4-dioxaspiro[4.5]dec-7-en

Reaction scheme 31

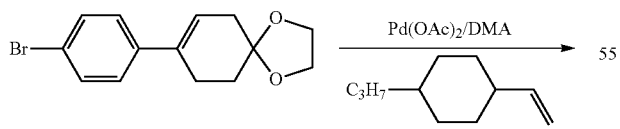

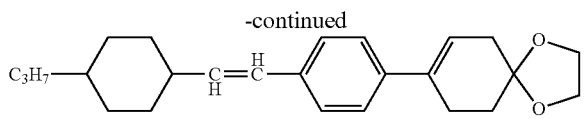

30 mL of solution including $K_3PO_4$ (6.27 g, 29.55 mmol) dissolved in dimethylacetamide solution (DMA) was poured to a flask filled with argon and slowly added by 8-(4-bromophenyl)-1,4-dioxaspiro[4.5]dec-7-en (5.8 g, 19.70 mmol) and 1-propyl-4-vinylcyclohexane (3.0 g, 19.70 mmol), and DMA (40 ml) with syringe dropwise. Then, DMA solution of $Pd(OAc)_2$ ($1.8 \times 10^{-3}$ M, 17 ml, 3.36 mmol) was added to the resultant solution, and reacted in preheated oil bath at 140° C. for 96 hours.

The reacting solution was poured to distilled water (10 ml) and extracted by ethyl acetate (20 ml×3 times). The organic layer was washed by salt water (10 ml×2 times), concentrated under reduced pressure, and filtered. The residue was purified with column chromatography (hexane:ether=1:1) to obtain 8-{4-[(E)-2-(4-propylcyclohexyl)ethenyl]phenyl}-1,4-dioxaspiro[4.5]dec-7-en (4.6 g, 63%).

Example 9-4

8-{4-[2-(4-propylcyclohexyl)ethyl]phenyl}-1,4-dioxaspiro[4.5]decane

Reaction scheme 32

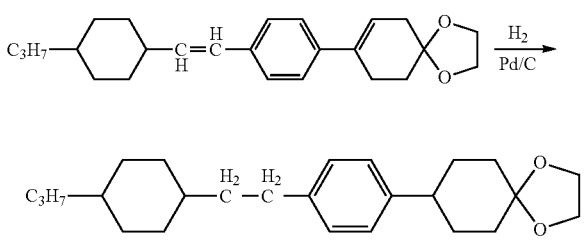

The 8-{4-[(E)-2-(4-propylcyclohexyl)ethenyl]phenyl}-1,4-dioxaspiro[4.5]dec-7-en (6.1 g, 16.64 mmol) was dissolved in a mixture of toluene and ethanol (toluene:EtOH=1:3). Pd/C (0.14 g) was added to 200 mL of the resulting solution and hydrogenated for 4 days. After reaction, Pd/C was removed by filtration, and the residue was purified column chromatography (hexane:ether=8:1) to obtain 8-{4-[2-(4-propylcyclohexyl)ethyl]phenyl}-1,4-dioxaspiro[4.5]decane (4.40 g, 72%).

Example 9-5

4-{4-[2-(4-propylcyclohexyl)ethyl]phenyl}cyclohexanone

Reaction scheme 33

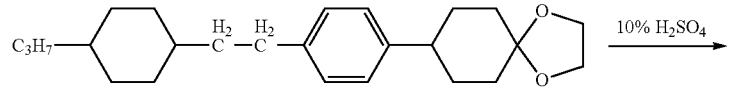

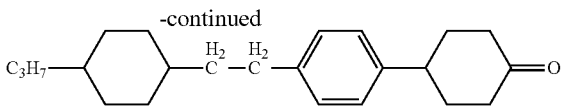

30 mL of toluene solution including 8-{4-[2-(4-propylcyclohexyl)ethyl]phenyl}-1,4-oxaspiro[4.5]decane (4.4 g, 11.87 mmol) was refluxed with addition of 10% sulfuric acid (20 ml) for 18 hours. After reaction termination, the toluene layer was washed by water (10 ml×3 times) and concentrated under reduced pressure to obtain 4-{4-[2-(4-propylcyclohexyl)ethyl]phenyl}cyclohexanone (3.2 g, 72%).

Example 9-6

1-[4-(methoxymethylene)cyclohexyl]-4-[2-(4-propyl-cyclohexyl)ethyl]benzene

Reaction scheme 34

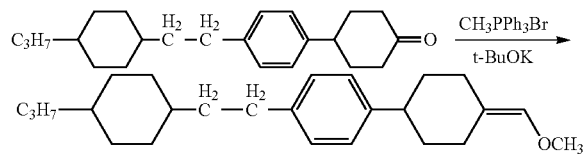

THF solution (20 ml) including methoxymethyltriphenylphosphonium chloride (2 g, 5.9 mmol) was slowly added by in solid potassium tert-butoxide (0.6 g, 5.9 mmol) for 3 minutes in a flask filled with argon gas at −10° C. and then stirred for 20 minutes with maintaining the temperature. The temperature of reacting solution was adjusted to 0° C., added slowly dropwise by THF solution (15 ml) of 4-{4-[2-(4-propylcyclohexyl)ethyl]phenyl}cyclohexanone (1.5 g, 4.5 mmol) and then was stirred by warming to a room temperature. After the reaction termination, the resulting solution was diluted by distilled water (20 ml), extracted by ether (20 ml×3 times), washed by distilled water (10 ml×2 times) and then concentrated under reduced pressure. The residue was purified by column chromatography (ethyl acetate:petroleum ether=1:40) to obtain 1-[4-(methoxymethylene)cyclohexyl]-4-[2-(4-propylcyclohexyl)ethyl]-benzene (1.2 g, 80%).

Example 9-7

Trans-4-{4-[2-(4-propylcyclohexyl)ethyl]phenyl}cyclohexane carbaldehyde

Reaction scheme 35

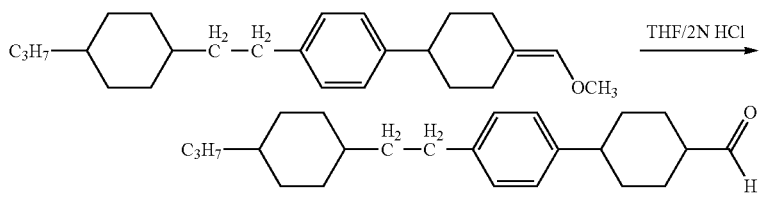

1-[4-(methoxymethylene)cyclohexyl]-4-[2-(4-propylcyclohexyl)ethyl]-benzene (1.23 g, 2.74 mmol) was refluxed by a mixture of THF and 2N HCl (10 ml) in a volume ratio of 4:1. After reaction termination, the resulting solution was diluted by distilled water (10 ml), extracted by ether extraction (5 ml×2 times), and washed by distilled water (5 ml×2 times). The residue was purified by column chromatography (ethyl acetate:petroleum ether=1:60). The ratio of cis or trans-isomer of the obtained crystal was 1:5 with NMR analysis. The crystal was performed by fractional recrystallization with hexane to obtain pure trans-4-{4-[2-(4-propylcyclohexyl)ethyl]phenyl}cyclohexane carbaldehyde (0.2 g, 18%).

Example 9-8

1-[2-(4-propylcyclohexyl)ethyl]-4-(4-vinylcyclohexyl)-benzene

Reaction scheme 36

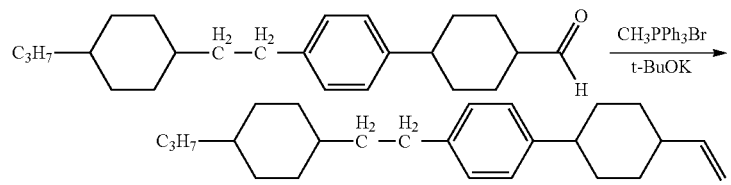

THF solution (5 ml) including methyltriphenylphosphonium bromide (0.25 g, 0.7 mmol) was slowly added by potassium tert-butoxide (0.07 g, 0.7 mmol) for 3 minutes and then stirred for 1 hour at a room temperature. The resulting solution was added slowly dropwise by THF solution (2 ml) of trans-4-{4-[2-(4-propylcyclohexyl)ethyl]phenyl}cyclohexane-carbaldehyde (0.2 g, 0.58 mmol) and stirred for 24 hours with maintaining the same temperature. After the reaction termination, white precipitate was removed by filtration. The filtered solution was extracted by ether (10 ml×3 times) and the organic layer was collected and washed by distilled water (10 ml×2 times) and salt water (10 ml×2 times). The residue was purified by column chromatography (petroleum ether) to obtain a final product of 1-[2-(4-propylcyclohexyl)ethyl]-4-(4-vinylcyclohexyl)benzene (0.12 g, 65%).

$^1$H NMR δ0.86 (t, 3H), 0.90-2.00 (m, 25H), 2.43 (tt, 1H), 2.54-2.60 (m, 2H), 4.91 (dd, 1H), 5.00 (d, 1H), 5.82 (ddd, 1H), 7.10 (s, 4H)

M+=338

Examples 10-17 and Comparative Examples 1-3

Preparation of Liquid Crystal Composition

The liquid crystal composition was prepared by mixing the compounds of chemical formula 1 and chemical formula 2, and comparative liquid crystal compound at each amount of 10 wt %. Base composition was the conventional host composition that was generally used as a liquid crystal composition.

In Comparative Example 1, the liquid crystal composition did not include the compounds of chemical formulae 1 and 2 but only included the conventional base composition.

The viscosity and phase transition temperature (TN-I) of the liquid crystal composition were measured and shown in Table 1.

TABLE 1

| Liquid crystal compound | | TN-I (° C.) | viscosity (mm$^2$s$^{-1}$) |
|---|---|---|---|
| Example10 | 1-[2-(4-propylcyclohexyl)-ethenyl]-4-(4-vinylcyclohexyl)benzene | 89.7 | 16.84 |
| Example11 | 1-[2-(4-pentylcyclohexyl)-ethenyl]-4-(4-vinylcyclohexyl)benzene | 89.8 | 17.31 |
| Example12 | 1-[2-(4-propylbicyclohexyl)-ethenyl]-4-(4-vinylcyclohexyl)benzene | 104.0 | 17.42 |
| Example13 | 1-[2-(4-pentylbicyclohexyl)-ethenyl]-4-(4-vinylcyclohexyl)benzene | 104.3 | 17.31 |
| Example14 | 1-[2-(4-propylcyclohexyl)-ethyl]-4-(4-vinylcyclohexyl)benzene | 80.7 | 15.46 |
| Example15 | 1-[2-(4-pentylcyclohexyl)-ethyl]-4-(4-vinylcyclohexyl)benzene | 82.4 | 15.34 |
| Example16 | 1-[2-(4-propylbicyclohexyl)-ethyl]-4-(4-vinylcyclohexyl)benzene | 93.2 | 16.73 |
| Example17 | 1-[2-(4-pentylbicyclohexyl)-ethyl]-4-(4-vinylcyclohexyl)benzene | 95.9 | 16.38 |
| Comparative Example1 | — | 77.1 | 15.0 |
| Comparative Example2 | 4'-ethyl-4-(4-pentylcyclohexyl)-biphenyl | 86.7 | 17.54 |
| Comparative Example3 | 4,4'-bis-(4-propyl-cyclohexyl)-biphenyl | 101 | 18.11 |

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal compound represented by chemical formula 1:

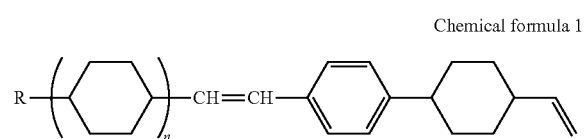

Chemical formula 1 where R is C1-C15 alkyl and n is 1 or 2.

2. The liquid crystal compound of claim 1, wherein R is C2-C7 alkyl.

3. A liquid crystal compound represented by chemical formula 2:

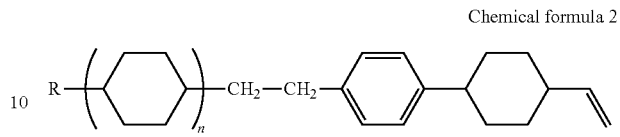

Chemical formula 2 where R is C1-C15 alkyl and n is 1 or 2.

4. The liquid crystal compound of claim 3, wherein R is C2-C7 alkyl.

5. A preparation method of a liquid crystal compound represented by chemical formula 1, comprising the steps of
preparing trans-compound of chemical formula 4 by reducing the compound of chemical formula 5 with sodium bis(2-methoxyethoxy)aluminum anhydride, and
reacting the trans-compound of chemical formula 4 according to Wittig reaction:

Chemical formula 1

Chemical formula 4

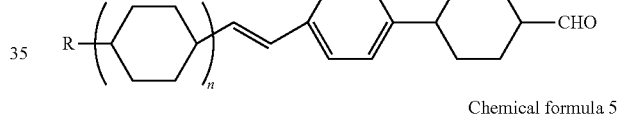

Chemical formula 5 where R is C1-C15 alkyl and n is 1 or 2.

6. The preparation method of claim 5, wherein the compound of chemical formula 5 is prepared by the compound of chemical formula 6 and the compound of chemical formula 7:

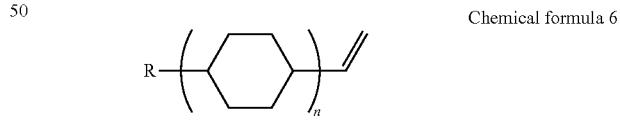

Chemical formula 6

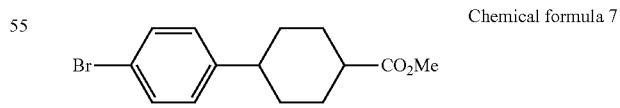

Chemical formula 7 where R is C1-C15 alkyl and n is 1 or 2.

7. A preparation method of a liquid crystal compound represented by chemical formula 2, comprising the steps of
hydrogenating the compound of chemical formula 5 to produce the compound of chemical formula 5-1,
preparing the compound of chemical formula 3 by reducing the compound of chemical formula 5-1 with sodium bis(2-methoxyethoxy)aluminum anhydride, and reacting the compound of chemical formula 3 according to Wittig reaction:

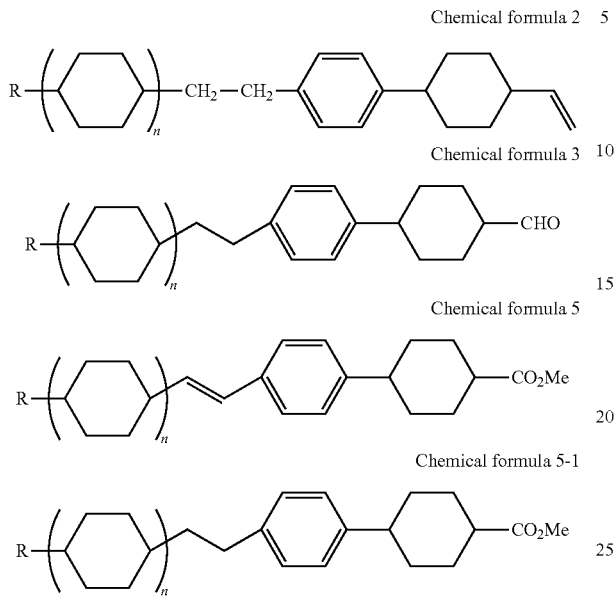

Chemical formula 2

Chemical formula 3

Chemical formula 5

Chemical formula 5-1 where R is C1-C15 alkyl and n is 1 or 2.

8. The preparation method of claim 7, wherein the compound of chemical formula 5 is prepared by reacting the compound of chemical formula 6 and the compound of chemical formula 7:

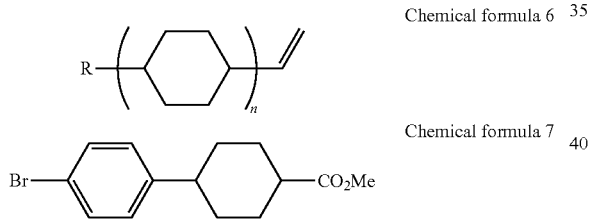

Chemical formula 6

Chemical formula 7 where R is C1-C15 alkyl, and n is an integer of 1 or 2.

9. A preparation method of a liquid crystal compound represented by chemical formula 2, comprising the steps of
hydrogenating the compound of chemical formula 13 to produce the compound of chemical formula 12,
hydrolyzing the compound of chemical formula 12 to produce the compound of chemical formula 11,
reacting the compound of chemical formula 11 according to Wittig reaction to produce the compound of chemical formula 10,
hydrolyzing the compound of chemical formula 10 to produce the compound of chemical formula 3, and
reacting the compound of chemical formula 3 according to Wittig reaction:

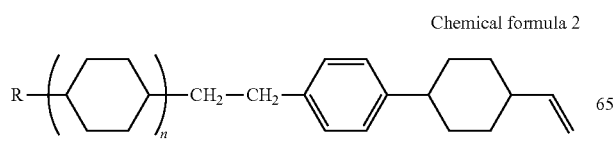

Chemical formula 2

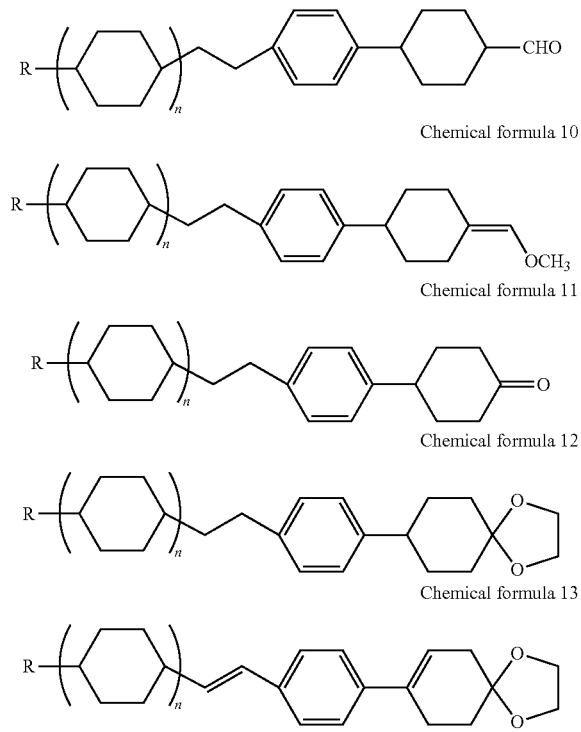

Chemical formula 3

Chemical formula 10

Chemical formula 11

Chemical formula 12

Chemical formula 13 where R is C1-C15 alkyl and n is 1 or 2.

10. The preparation method of claim 9, wherein the compound of chemical formula 13 is prepared by the compound of chemical formula 6 and the compound of chemical formula 14:

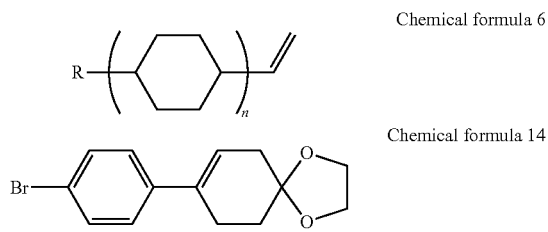

Chemical formula 6

Chemical formula 14

Where R is C1-C15 alkyl and n is 1 or 2.

11. A liquid crystal composition comprising at least one selected from the group consisting of the compound of chemical formula 1 and the compound of chemical formula 2:

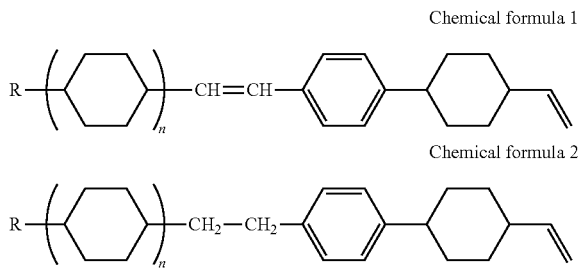

Chemical formula 1

Chemical formula 2 where R is C1-C15 alkyl, and n is 1 or 2.

* * * * *